US 11,494,721 B1

(12) United States Patent
Lah

(10) Patent No.: US 11,494,721 B1
(45) Date of Patent: Nov. 8, 2022

(54) ARTIFICIAL INTELLIGENCE SYSTEM FOR ELECTRONICALLY MONITORING AND ANALYZING DATA TRANSMITTED THROUGH MULTIPLE ELECTRONIC CHANNELS TO SUGGEST ACTIONS FOR INCREASING THE EFFECTIVENESS OF DATA TRANSMITTED THROUGH THE CHANNELS

(71) Applicant: Thomas Lah, Columbia, MD (US)

(72) Inventor: Thomas Lah, Columbia, MD (US)

( * ) Notice: Subject to any disclaimer, the term of this patent is extended or adjusted under 35 U.S.C. 154(b) by 0 days.

(21) Appl. No.: 16/059,379

(22) Filed: Aug. 9, 2018

Related U.S. Application Data

(60) Provisional application No. 62/550,822, filed on Aug. 28, 2017.

(51) Int. Cl.
*G06Q 10/06* (2012.01)
*G06K 9/62* (2022.01)
(Continued)

(52) U.S. Cl.
CPC ....... *G06Q 10/0637* (2013.01); *G06K 9/6256* (2013.01); *G06N 5/04* (2013.01); *G06N 20/00* (2019.01); *G06Q 30/0201* (2013.01)

(58) Field of Classification Search
CPC ............. G06Q 10/0637; G06Q 10/063; G06Q 30/0201; G06Q 30/02; G06N 10/00;
(Continued)

(56) References Cited

U.S. PATENT DOCUMENTS 7,054,837 B2 * 5/2006 Hoffman ................ G06Q 10/06
705/28
7,974,983 B2 7/2011 Goeldi
(Continued)

FOREIGN PATENT DOCUMENTS

JP 2013125418 * 6/2013

OTHER PUBLICATIONS

Zadeh, Amir Hassan, and Ramesh Sharda. "Modeling brand post popularity dynamics in online social networks." Decision Support Systems 65 (2014): 59-68. (Year: 2014).*
(Continued)

*Primary Examiner* — Patricia H Munson
*Assistant Examiner* — Hamzeh Obaid
(74) *Attorney, Agent, or Firm* — Sheppard Mullin Richter & Hampton LLP

(57) ABSTRACT

The disclosure relates to a technology that provides a user customizable interface to select data from different channels and create rules to apply to the data and an analysis engine to automatically obtain and process data from the selected channels, apply the rules, determine a effectiveness score for each data set and the overall data set and generate and present marketing strategy suggestions based on the determined effectiveness. An artificial intelligence system may analyze and increase effectiveness of multi-channel data marketing strategies including computer-implemented program instructions for multi-channel data aggregation from predetermined sources, analysis of the data, reporting functionality and computer-generated user interface the presents results to users, including recommended multi-channel marketing strategy suggestions. Each channel may include a networked electronic channel through data is transmitted to users over a network and from which such data and related information may be aggregated using electronic tools.

30 Claims, 7 Drawing Sheets

(51) Int. Cl.
*G06N 5/04* (2006.01)
*G06Q 30/02* (2012.01)
*G06N 20/00* (2019.01)

(58) Field of Classification Search
CPC ........ G06N 20/00; G06N 20/10; G06N 20/20; G06N 5/04; G06K 9/6256
See application file for complete search history.

(56) References Cited

U.S. PATENT DOCUMENTS

| | | | |
|---|---|---|---|
| 8,291,016 B1 | 10/2012 | Whitney | |
| 8,375,024 B2 | 2/2013 | Goeldi | |
| 8,452,639 B2* | 5/2013 | Abe | G06Q 10/06315 |
| | | | 705/7.31 |
| 8,504,616 B1 | 8/2013 | Whitney | |
| 8,949,330 B2 | 2/2015 | Chennamadhavuni | |
| 9,015,247 B2 | 4/2015 | Whitney | |
| 9,021,025 B1 | 4/2015 | Whitney | |
| 9,070,140 B2 | 6/2015 | Allard | |
| 9,508,082 B1* | 11/2016 | Mannix | G06Q 30/0201 |
| 9,633,399 B2* | 4/2017 | George | G06Q 30/0269 |
| 10,319,046 B2* | 6/2019 | Doyle | G06Q 30/0269 |
| 2004/0034652 A1* | 2/2004 | Hofmann | G06F 16/335 |
| 2007/0143179 A1* | 6/2007 | Eyal | G06Q 30/00 |
| | | | 705/14.41 |
| 2010/0030722 A1 | 2/2010 | Goodson | |
| 2010/0119053 A1 | 5/2010 | Goeldi | |
| 2010/0121707 A1 | 5/2010 | Goeldi | |
| 2010/0121843 A1 | 5/2010 | Goeldi | |
| 2011/0307312 A1 | 12/2011 | Goeldi | |
| 2012/0089429 A1 | 4/2012 | Geddes | |
| 2013/0085804 A1* | 4/2013 | Leff | G06Q 30/0219 |
| | | | 705/7.29 |
| 2013/0173573 A1 | 7/2013 | Song | |
| 2014/0236673 A1 | 8/2014 | Smith | |
| 2014/0236931 A1 | 8/2014 | Smith | |
| 2014/0244759 A1 | 8/2014 | Smith | |
| 2014/0258408 A1 | 9/2014 | Smith | |
| 2015/0032675 A1* | 1/2015 | Huehn | G06Q 50/01 |
| | | | 706/12 |
| 2015/0237061 A1* | 8/2015 | Shraim | H04L 63/1491 |
| | | | 726/22 |
| 2016/0104069 A1* | 4/2016 | Garg | G06N 5/00 |
| | | | 706/11 |
| 2016/0232540 A1* | 8/2016 | Gao | G06Q 30/0201 |

OTHER PUBLICATIONS

Casillas, Jorge, and Francisco J. Martínez López, eds. Marketing intelligent systems using soft computing: Managerial and research applications. vol. 258. Springer, 2010. (Year: 2010).*

* cited by examiner

```
                              ┌─ 200
                              ▼

┌─────┐   ┌─────────────────────────────────────────────────────┐
  │ 202 │───│ AGGREGATE INFORMATION INDICATING ACTIVITY ON THE    │
  └─────┘   │ PLURALITY OF NETWORKED ELECTRONIC CHANNELS          │
            └─────────────────────────────────────────────────────┘
                              │
                              ▼
  ┌─────┐   ┌─────────────────────────────────────────────────────┐
  │ 204 │───│ UPDATE A COMPUTERIZED INTELLIGENCE MODEL BASED ON   │
  └─────┘   │ THE AGGREGATED INFORMATION                          │
            └─────────────────────────────────────────────────────┘
                              │
                              ▼
  ┌─────┐   ┌─────────────────────────────────────────────────────┐
  │ 206 │───│ RETRIEVE ONE OR MORE USER-DEFINED RULES DEFINED BY  │
  └─────┘   │ AN ENTITY THAT DEFINE PREFERENCES FOR SELECTING ONE │
            │ OR MORE MARKETING ACTIONS TO BE TAKEN               │
            └─────────────────────────────────────────────────────┘
                              │
                              ▼
  ┌─────┐   ┌─────────────────────────────────────────────────────┐
  │ 208 │───│ IDENTIFY, FOR A FIRST ENTITY, AT LEAST A FIRST      │
  └─────┘   │ RESULT TO BE ACHIEVED BY THE ONE OR MORE MARKETING  │
            │ ACTIONS BASED ON THE ONE OR MORE USER-DEFINED RULES │
            └─────────────────────────────────────────────────────┘
                              │
                              ▼
  ┌─────┐   ┌─────────────────────────────────────────────────────┐
  │ 210 │───│ CORRELATE, VIA THE COMPUTERIZED INTELLIGENCE        │
  └─────┘   │ MODEL, THE FIRST RESULT TO BE ACHIEVED WITH THE     │
            │ FIRST RESULT METRIC AND THE FIRST INPUT METRIC WITH │
            │ A FIRST MARKETING ACTION TO BE TAKEN                │
            └─────────────────────────────────────────────────────┘
                              │
                              ▼
  ┌─────┐   ┌─────────────────────────────────────────────────────┐
  │ 212 │───│ GENERATE A SUGGESTION FOR THE ENTITY TO TAKE THE    │
  └─────┘   │ FIRST ACTION                                        │
            └─────────────────────────────────────────────────────┘
                              │
                              ▼
  ┌─────┐   ┌─────────────────────────────────────────────────────┐
  │ 214 │───│ PROVIDE THE SUGGESTION VIA A DASHBOARD INTERFACE    │
  └─────┘   └─────────────────────────────────────────────────────┘
```

ARTIFICIAL INTELLIGENCE SYSTEM FOR ELECTRONICALLY MONITORING AND ANALYZING DATA TRANSMITTED THROUGH MULTIPLE ELECTRONIC CHANNELS TO SUGGEST ACTIONS FOR INCREASING THE EFFECTIVENESS OF DATA TRANSMITTED THROUGH THE CHANNELS

RELATED APPLICATIONS

This application claims priority to U.S. Provisional Patent Application Ser. No. 62/550,822, filed on Aug. 28, 2017, entitled, "ARTIFICIAL INTELLIGENCE SYSTEM FOR ELECTRONICALLY MONITORING AND ANALYZING DATA TRANSMITTED THROUGH MULTIPLE ELECTRONIC CHANNELS TO SUGGEST ACTIONS FOR INCREASING THE EFFECTIVENESS OF DATA TRANSMITTED THROUGH THE CHANNELS," the content of which is hereby incorporated by reference in its entirety herein.

FIELD OF THE INVENTION

The invention relates to a technology that provides a user customizable interface to select data from different channels and create rules to apply to the data and an analysis engine to automatically obtain and process data from the selected channels, apply the rules, determine a effectiveness score for each data set and the overall data set and generate and present marketing strategy suggestions based on the determined effectiveness.

BACKGROUND OF THE INVENTION

Various tools exist that purport to measure the effectiveness of marketing strategies. Known systems suffer from various drawbacks. One of the problems is that in this digital marketing age, there is too much information to be processed and consumed by marketing professionals and not sufficient technology to meaningfully analyze and effectively use this data.

Additionally, there are a multitude of potential sales and marketing channels: email, web, social media, content marketing, automated remarketing, digital advertising, Search Engine Optimization ("SEO"), mobile apps, and a host of other digital applications for customer engagement. For as many marketing verticals that exist, there are even more tools, produced by both vendors and internal development teams. While these tools and systems provide opportunities for customer engagement and sales, they also dramatically increase the complexity required to analyze the effectiveness of a marketing strategy. Often the data from different marketing channels is separately analyzed.

Often this data is not comprehensively or effectively aggregated. Assuming the data from all these disparate systems could be aggregated, then marketing agents must decide what the data means and attempt to develop it into a productive strategy. This is especially difficult since most marketers are non-technical, yet they must make sense of data coming from so many technology-based systems.

In addition to the massive amounts of data that must be analyzed from a plethora of sources, to meaningfully impact business results this data needs to be converted into actionable strategies. The technology for doing this is lacking.

SUMMARY OF THE INVENTION

The invention, addressing these and other drawbacks of the known systems, comprises an artificial intelligence system for analyzing and increasing effectiveness of multi-channel data marketing strategies including computer-implemented program instructions for multi-channel data aggregation from predetermined sources, analysis of the data, reporting functionality and computer-generated user interface the presents results to users, including recommended multi-channel marketing strategy suggestions (also referred to interchangeably as "recommendations") that they can implement, and a feedback mechanism to assess the results of the implemented strategies and use the artificial intelligence system to update and refine the strategies. Each channel may include a networked electronic channel through data is transmitted to users over a network and from which such data and related information may be aggregated using electronic tools.

In an implementation, users of the system may specify various rules that indicate certain goals to be achieved through computerized intelligence processing. For example, the rules may specify sales goals preferences, monetary instrument preferences, a location preference, a location reach, a monthly demand quotient, an event sensitivity quotient, customer loyalty program preferences, and/or other goals or preferences. One or more of these rules may be used to guide computerized intelligence processing that provides strategic recommendations to achieve goals specified by the rules. This allows the computerized intelligence to automatically generate recommendations based on information parsed from and learned about data from the various channels.

Because of the diverse nature of the channels, the system may implement various networked data connectors, which may connect to and obtain data from the channels. The obtained data may be stored in an aggregated channel information database, such as a database for retrieval and analysis, as will be described below. This data may represent a company's marketing footprint (e.g., marketing activities). In some implementations, a given channel may have multiple services (which may be referred to as sub-channels). For instance, a social media platform channel may include multiple services such as Facebook™, Twitter™, Google+™ and the like. The system may implement a data connector for each channel or each sub-channel and/or implement a single data connector for two or more channels or sub-channels.

In some instances, a custom designed connector may be generated and used by the system to query data from systems that do not expose APIs. For instance, CRM platforms may be queried using various data retrieval techniques, which a custom designed connector may use to obtain CRM data.

Because each channel (and sub-channel) may implement different data formats, the system may implement a data interpretation engine, which may interpret and/or normalize the data to account for formatting or other differences among the output from different channels (or sub-channels). For example, Facebook™ has "friends" and Twitter™ has "followers". The data interpretation engine may interpret and normalize "friends" and "followers" to equate to "social media contacts." In this manner, these data values may be normalized to a common reference (the interpreted and normalized may be referred to hereinafter as "internalized data").

In an implementation, the system may implement an analytics and scoring engine, which may, for a given company, obtain the internalized data and generate scores for the company for each channel. For example, analytics and scoring engine may generate a social media score that indicates a performance of the company with respect to social media. In another example, analytics and scoring engine may generate an SEO score that indicates how well the company's SEO is performing.

In an implementation, the system may implement a decision engine, which uses the data generated by the analysis and scoring engine to decide whether action should be taken by a company with respect to a particular channel. In some instances, the decision may be domain-specific, such as based on particular industries. For example, based on social media scores or other social media related data of other companies in the same industry, the decision engine may determine that a company should have a certain level of performance in a given channel. If such performance is not achieved, the decision engine may determine that the company should take such action to remedy the situation.

In an implementation, the system may implement a strategy suggestion generator, which may use output from the decision engine to present comprehensive marketing strategy improvements across some or all channels related to the company. Generally speaking, the strategy suggestion generator may employ computerized machine learning and intelligence techniques to analyze the internalized data, the external data, and/or other data that is available to the system (referred to hereinafter as corpus of data). The examples that follow are intended for illustrative and non-limiting purposes, as other techniques may be used as would be appreciated based on the disclosure herein.

To employ such computerized learning and intelligence, the strategy suggestion generator may determine correlations between data elements in the corpus of data even if those data elements seem unrelated. The system may analyze the corpus of data and run continuous correlation analysis to determine the direction of value changes of one metric relative to a matrix of other metrics. The purpose is to identify correlative relationships between data elements in order to statistically gauge the probability of downstream consequences of certain actions and identify relationships between data that may be less apparent from casual observation.

In one particular non-limiting example, the strategy suggestion generator may generate a computerized intelligence model (hereinafter "model" for convenience) having relevant parameters. The parameters may indicate input metrics that correlate with result metrics. The input metrics may include a set of metrics that may impact the result metrics. For instance, the input metrics may correlate with certain actions or states that occur to result in a given result, which may correspond with a goal to be achieved. The input metrics may include, without limitation, a specific action that has been taken (e.g., post social media with a certain frequency) or a specific state (e.g., company has one million followers). The result metrics may include a state that is determined to be impacted by one or more of the input metrics. For example, the model may assume that posting three times a week is correlated with increasing the number of followers of a company by a number X and that posting four times a week is correlated with increasing the number of followers of a company by a number Y. Other numbers of assumptions may be used as well, and other types of input and result metrics may be used based on this example.

Over time (e.g., each time new data is available and/or when the models are updated), the system may observe various companies (which may or may not be done in a domain-specific and/or other subset of companies manner) that post three times a week and companies that post social media four times a week. The system may correlate the number of posts made with the number of followers that resulted within an amount of time after the weekly social media posts. As the model is updated the assumptions may be revised based on empirical data. For instance, the numbers X and Y may be revised as new data is used to train the model. In this manner, the strategy suggestion generator may continuously learn as data is added to (i.e., observed by) the system.

In some implementations, the foregoing learning and intelligence may be applied system-wide and applied to all companies across multiple domains. In some implementations, the foregoing learning and intelligence may be domain-specific. For example, each industry may be associated with its own set of one or models that are applied to all companies in the industry. In some implementations, the foregoing learning and intelligence may be specifically targeted to subsets within a domain. For example, a set of close competitors in an industry (as defined by the company or others) may be associated with its own set of one or more models. In some implementations, the foregoing learning and intelligence may be company-type specific, which may (or may not) be further domain-specific. For example, small, medium, large, and/or other sized companies (as defined by one or more parameters such as employee count, revenue, etc.) in a given industry may be associated with its own set of one or more models. As such, the learning and intelligence may be specialized for specific sets of companies or generalized for broader sets of companies.

For example, the strategy suggestion generator may analyze metrics such as tweet frequency and suggest that the company should send tweets at least 3 times per week. If the company's tweet frequency is high, but they are still not attracting followers (i.e., not following the model's machine-learned prediction), the decision engine may make other suggestions to increase the number of new followers, such as suggested the content to include in their tweets or other strategies that will increase their following. Such suggestions may be made based on observations of prior suggestions (including for other companies, whether or not in the same industry) and their effects on increasing performance with respect to the relevant channel. For example, based on prior suggestions or observations that a company that tweets 3 times per week increases their number of followers by a certain amount, the decision engine may learn that such tweet frequency is likely to achieve a certain result (in this case, increasing the number of new followers).

Companies using the system may sell products and/or services. Each product or service may have distinct properties that the strategy suggestion generator uses to develop suggested actions. As such, the strategy suggestion generator may obtain the user-defined rules to implement computer intelligence for making the strategy suggestions. As such, one company's strategy suggestions may differ from another company's strategy suggestions based on their user-defined rules, even though the computer intelligence used by strategy suggestion generator is used to suggest strategies for both companies. These rules may relate to sales goal preference, monetary instrument preference, location preference, location reach, monthly demand quotient, event sensitivity quotient, customer loyalty programs, customer traceability and behavior recognition, market platforms and effectiveness indices, potential actions, discounts, correlation tracking, and/or other preference-based rules.

In an implementation, the strategy suggestion engine may suggest actions, such as marketing actions, that can be accepted or rejected by the company. For instance, the suggestions may be provided to the company via a dashboard, which is described further below. Via the dashboard, in some instances, the company may select whether or not to proceed with the suggestions. These actions may be bundled together as a group to form specific strategies. Various actions may be suggested based on real-time data from the various channels. As used herein, the term "real-time" may refer to receipt data by the strategy and suggestion engine from the connectors that triggers processing to generate a suggestion to perform an action. Put another way, in some instances, strategy and suggestion engine may attempt to determine suggestions upon receipt of data relating to the company as monitored and aggregated from one or more of the channels.

It should be noted that the suggestions may, in some implementations, be driven by user-defined rules (described above) that specify certain preferences of the company. In this manner, the company may specify certain strategies should be favored over others and the computerized intelligence of the system may make appropriate suggestions based on data monitored and learned relating to one or more of the channels. Thus, the system may make specific, customized suggestions for different companies using common intelligence learned from multi-domain and multi-company data from channels. Various types of suggestions may be implemented, some examples of which will be described.

In some implementations, strategy and suggestion engine may obtain external data from one or more data services to factor such data into its suggestion. The external data may include, without limitation, weather information, traffic information, current event information (including political, local, sports, etc.), and/or other types of data that is external to the system. In some instances, external data may be obtained from the one or more channels (e.g. obtain weather information from social media posts) or outside the one or more channels (e.g., obtain weather information from a weather service).

For implementations that use external data, strategy and suggestion engine may use the external data as a parameter in its modeling. For example, weather information may be correlated with actions and results in a model. In a particular example, strategy and suggestion engine may learn, from the internalized data and the external data, that inclement weather hampers a particular company's business (or the business of industry to which the company belongs). In other words, the strategy and suggestion engine may correlate various observed weather conditions with observed business performance (e.g., sales) and observed actions (e.g., marketing activities). Using the modeling, strategy and suggestion engine may suggest that the company suspend certain actions such as marketing activities because their effectiveness during inclement weather is reduced (e.g. deviating from a threshold amount) and external data indicating that inclement weather is expected. In some instances, strategy and suggestion engine may make time-bound suggestions, such as to suspend marketing activities for four days until the inclement weather is expected to pass. Because strategy and suggestion engine may operate in real-time, these and other suggestions may be updated based on updated internalized data and/or updated external data (e.g., revised weather forecast).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 depicts a process of an artificial intelligence system for analyzing and increasing effectiveness of multi-channel data marketing strategies, according to an implementation of the invention.

FIG. 5 depicts a screenshot of a dashboard interface for displaying and receiving acceptances of suggested actions, according to an implementation of the invention.

DETAILED DESCRIPTION OF THE INVENTION

Figure 1:
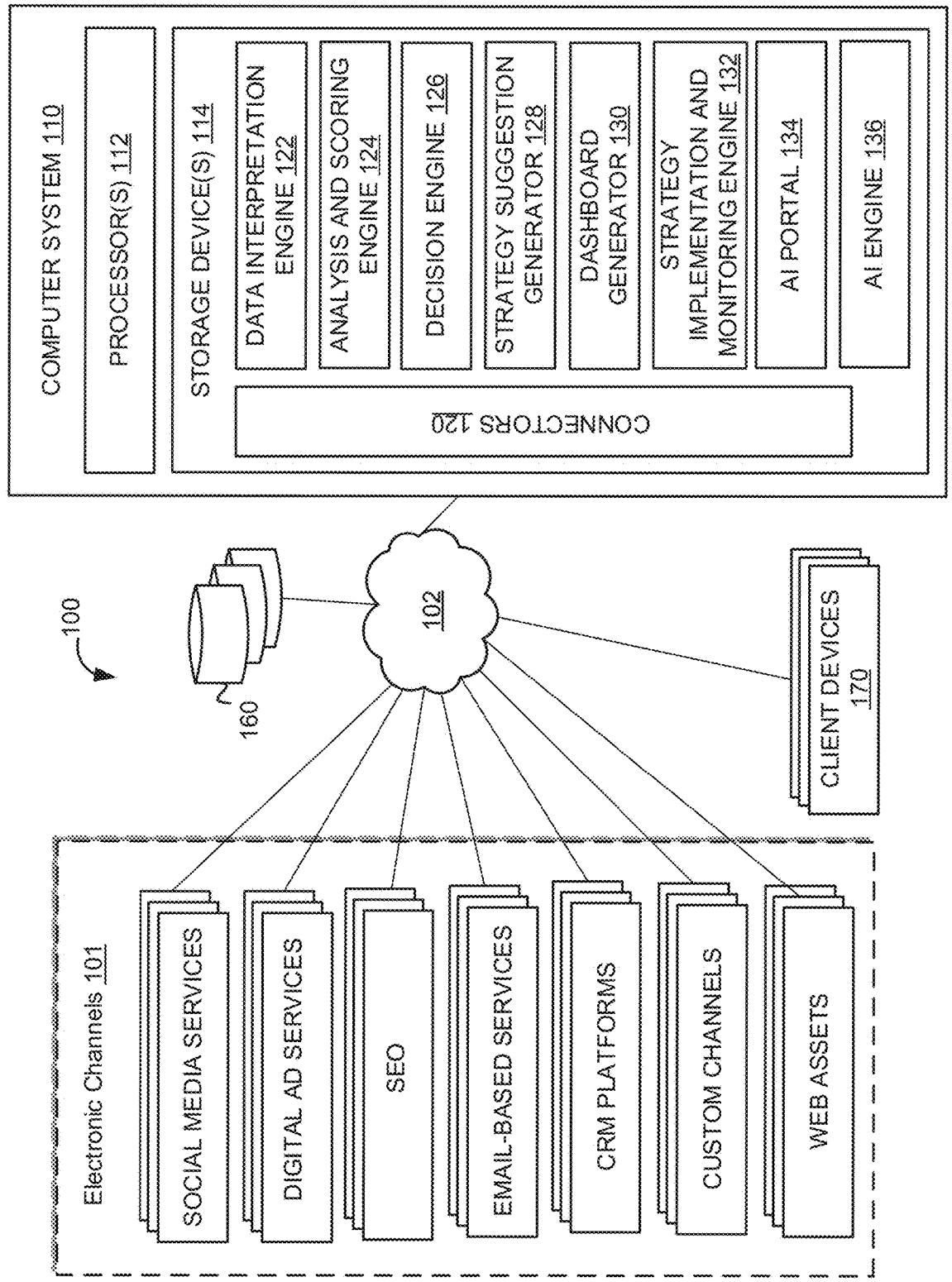
FIG. 1 illustrates an exemplary artificial intelligence system for analyzing and increasing effectiveness of multi-channel data marketing strategies, according to an implementation of the invention.

The invention described herein relates to systems and methods implementing technology that provides a user customizable interface to select data from different channels and create rules to apply to the data and an analysis engine to automatically obtain and process data from the selected channels, apply the rules, determine a effectiveness score for each data set and the overall data set and generate and present marketing strategy suggestions based on the determined effectiveness. As used herein, the term "effectiveness" refers to an ability to achieve certain goals. Thus, to increase effectiveness of marketing strategies means to be able to either achieve or exceed certain goals of those marketing strategies.

In an implementation, for example, a system 100 may monitor, analyze, and suggest strategies for data transmission to users via various networked electronic channels 101 over network 102. Depending on various factors such as the domain of a company (e.g., the industry to which a given company belongs), date, season, weather, target demographics, content of data transmissions, and/or other factors, some networked electronic channels and/or content may be more effective at achieving certain goals (e.g., marketing or sales goals) than others. Because of the variety of different networked electronic channels and the various factors that influence whether or not use of a given networked electronic channel will facilitate achievement of those goals, the system may employ computerized artificial intelligence to parse, learn from and adapt to these and other variables.

A company may therefore use the system to achieve certain goals, which may be predefined by the company. The company may wish to achieve one or more goals such as, without limitation, maximize sales or profits, achieve name recognition, maximize social connections to users, maximize web presence, maximize fundraising, etc. Such goals may be specified by user-defined rules (e.g., rules specified by a user who works on behalf of the company). The system may analyze the rules, apply the rules along with computerized intelligence described herein, and suggest strategies for using some or all of the networked electronic channels 102 (referred to interchangeably as channels 102). The suggested strategies may include an identification of some or all of the channels 102 that should be used for marketing strategies, specific actions (other than using certain channels) that should be taken to achieve the goals, and/or other suggestions. As used herein, the term company will be used for illustrative and not limiting purposes. Other types of entities such as charities, schools, and individual users may use the features and functions of the systems and methods described herein.

Rules-Based Computerized Intelligence for Generating Strategic Recommendations

As previously noted, users may specify various rules that indicate certain goals to be achieved through computerized intelligence processing. For example, the rules may specify sales goals preferences, monetary instrument preferences, a location preference, a location reach, a monthly demand quotient, an event sensitivity quotient, customer loyalty program preferences, and/or other goals or preferences. One or more of these rules may be used to guide computerized intelligence processing that provides strategic recommendations to achieve goals specified by the rules. This allows the computerized intelligence to automatically generate recommendations based on information parsed from and learned about data from the various channels.

Exemplary System Architecture

FIG. 1 illustrates an exemplary artificial intelligence system 100 (used interchangeably with "system 100") for analyzing and increasing effectiveness of multi-channel data marketing strategies. In one implementation, system 100 may include networked electronic channels 101, a computer system 110, one or more databases 160, one or more client devices 170, and/or other components.

Networked Electronic Channels 101

In an implementation, system 100 may monitor, analyze, and suggest strategies for data transmission to users via various networked electronic channels 101 over network 102. The networked electronic channels 101 are channels through which data may be transmitted from one user (e.g., the company) to another user (e.g., target users). Such channels may include third party channels that transmit data to the target users, which may be on behalf of the company. The networked electronic channels 101 may include different types of platforms such as, without limitation, social media services, digital ad services, search engine providers through which Search Engine Optimizations ("SEO") can be configured, email-based services, customer relationship management ("CRM") platforms, custom channels (e.g., mobile applications), web assets such as company websites, and/or other channels.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to implement an artificial intelligence system for analyzing and increasing effectiveness of multi-channel data marketing strategies.

Computer system 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by data connectors 120, a data interpretation engine 122, an analysis and scoring engine 124 for generating component scores for different channels and an aggregate score, a decision engine 126, a strategy suggestion generator 128, a computer-generated user dashboard 130, a strategy implementation and monitoring engine 132, an Artificial Intelligence ("AI") portal 134, an AI engine 134, and/or other components. As used herein, for convenience, the various instructions will be described as performing an operation, when, in fact, the various instructions program the processors 112 (and therefore computer system 110) to perform the operation.

Data Connectors

In an implementation, data connectors 120 may connect to and obtain data from the channels 101. The obtained data may be stored in an aggregated channel information database, such as a database 160 for retrieval and analysis, as will be described below. This data may represent a company's marketing footprint (e.g., marketing activities). In some implementations, a given channel 101 may have multiple services (which may be referred to as sub-channels). For instance, a social media platform channel may include multiple services such as Facebook™ Twitter™, Google+™ and the like. The system may implement a data connector 120 for each channel 101 or each sub-channel) and/or implement a single data connector 120 for two or more channels 101 or sub-channels.

In some implementations, a channel 101 (or sub-channel) may provide an Application Programming Interface ("API"). In these implementations, the system may implement a data connector 120 that connects to the API using various functions and calls exposed by the API. For example, social media tools such as Facebook™, Twitter™, GOOGLE+, and others each have public APIs for tracking any activity on their platforms. These APIs allow retrieval of various content such as social media posts made to the platform from its user base. Google Analytics™ also exposes an API that allows the system to warehouse data about an organization's web presence, SEO, and ad performance.

In some instances, a custom designed connector 120 may be generated and used by the system to query data from systems that do not expose APIs. For instance, CRM platforms may be queried using various data retrieval techniques, which a custom designed connector may use to obtain CRM data. Thus, whether or not a channel 101 exposes an API, a given data connector 120 may be customized to connect to, monitor, and obtain data from the channel. This allows the system to flexibly and scalability add new channels 101 while deprecating or updating others. In this manner, connectors 120 may aggregate metrics relating to marketing performance data from a wide range of tools and platforms.

In an implementation, each connector 120 may aggregate data for a given company and associate the aggregated data with the company. For example, a connector 120 may aggregate social media posts relating to a company, a connector 120 may obtain advertising and SEO metrics relating to the company and so on. The aggregated data may be stored in association with the company. For instance, an identifier for the company may be linked to each content relating to the company that was aggregated from the various connectors 120.

Data Interpretation Engine

Once data from different channels 101 has been obtained by the connectors 120, the data may be interpreted and/or normalized so as to account for formatting or other differences among the output from different channels (or sub-channels). For example, Facebook™ has "friends" and Twitter™ has "followers". Both of these data metrics belong to the social media channel, and they have a similar interpretation, but are referred to differently. The data interpretation engine 122 may interpret and normalize "friends" and "followers" to equate to "social media contacts." In this manner, these data values may be normalized to a common reference (the interpreted and normalized may be referred to hereinafter as "internalized data"). The interpretation and normalization process may occur on data as it is received from the connectors 120 and store the internalized data, or the connectors 120 may store retrieved data in the aggregated channel information database, and the data interpretation engine 122 may operate on the stored data. In either instance, the internalized data may be stored in the aggregated channel information database.

Analytics and Scoring Engine

In an implementation, analytics and scoring engine 124 may, for a given company, obtain the internalized data and generate scores for the company for each channel 101. For example, analytics and scoring engine 124 may generate a social media score that indicates a performance of the company with respect to social media. In another example, analytics and scoring engine 124 may generate an SEO score that indicates how well the company's SEO is performing. analytics and scoring engine 124 may generate scores for the company for other channels 101 as well. In some instances, sub-scores for within a channel may be generated. For example, analytics and scoring engine 124 may generate a Facebook score for how well a company is performing on the Facebook platform, and similar scores for other social media platforms as well. The social media score may be based on the sub-scores in these instances.

Because each channel 101 is different from other channels, the manner of scoring may be different as well. For example, a social media score may be based on a number of social media contacts a company has while an SEO score may be based on how often or the ranking of the company for various search results.

In some implementations, analytics and scoring engine 124 may generate an overall score based on the scores for each channel 101. The overall score may range from −100 to 100, in which −100 is the lowest score and 100 is the highest. Other score values may be used as well. In some instances, analytics and scoring engine 124 convert the foregoing score values into other score values, such as a letter grade or other representation.

According to one example, each channel is given an effectiveness rating based on the industry and business model in which the customer operates. For example, a mortgage company would may an effectiveness ratio of 0 for Pinterest since there is very little use for Pinterest in abstract products. However, a handbag designer may have an effectiveness ratio of 100 for Pinterest. The net factor score can be a score that is an aggregate of different platforms that are applicable to the industry and ranks the effectiveness of the platform as well as the effectiveness of the customer's usage of the platform. It may take into account factors such as post frequency, number of social connections per platform, and/or other factors to determine the percentage score in which they fulfill the optimal usage pattern for each platform.

The channel scores and overall scores may be stored in association with the company. In some instances, the scores may be periodically updated. In some instances, the scores may be dynamically generated on-demand. In either instances, the scores may be displayed to a user via the dashboard described herein and/or used by the decision engine or other components.

Decision Engine

In an implementation, data generated by the analysis and scoring engine 124 may be used as input by the decision engine 126 to decide whether action should be taken by a company with respect to a particular channel 101. In some instances, the decision may be domain-specific, such as based on particular industries. For example, based on social media scores or other social media related data of other companies in the same industry, the decision engine 126 may determine that a company should be averaging 200 new followers per month on Twitter. However, if the data shows that the company has only 80 new followers per month, the decision engine 126 may determine that an action should be taken to increase the number of new followers per month. Similar decisions may be made for other channels 101 as well.

In some instances, the decision engine 126 may decide that an action should be taken with respect to a certain channel 101 because the score for that channel is underperforming other scores of other companies in the same industry. For example, decision engine 126 may determine that a company's social media score is underperforming another company's social media score in the same industry (such as a competitor's score) and/or industry average social media score. Such underperformance may be determined based on the difference between the company's score being below the other company or industry average social media score deviating from a threshold value (which may be predefined by a system-defined default or be set by the company).

Strategy Suggestion Generator

In an implementation, the strategy suggestion generator 128 may use output from the decision engine 126 to present comprehensive marketing strategy improvements across some or all channels 101 related to the company. In some instances, the strategy suggestion generator 128 may generate suggestions for a given channel 101 once it is decided that performance with respect to that channel should be increased. Alternatively or additionally, the strategy suggestion generator 128 may suggest an action that would achieve one or more goals specified in the user-defined rules.

Machine Learning and Intelligence to Generate Suggestions

Generally speaking, the strategy suggestion generator 128 may employ computerized machine learning and intelligence techniques to analyze the internalized data, the external data, and/or other data that is available to the system (referred to hereinafter as corpus of data). The examples that follow are intended for illustrative and non-limiting purposes, as other techniques may be used as would be appreciated based on the disclosure herein.

To employ such computerized learning and intelligence, the strategy suggestion generator 128 may determine correlations between data elements in the corpus of data even if those data elements seem unrelated. The system may analyze the corpus of data and run continuous correlation analysis to determine the direction of value changes of one metric relative to a matrix of other metrics. The purpose is to identify correlative relationships between data elements in order to statistically gauge the probability of downstream consequences of certain actions and identify relationships between data that may be less apparent from casual observation.

In one particular non-limiting example, the strategy suggestion generator 128 may generate a model having relevant parameters. The parameters may indicate input metrics that correlate with result metrics. The input metrics may include a set of metrics that may impact the result metrics. For instance, the input metrics may correlate with certain actions or states that occur to result in a given result, which may correspond with a goal to be achieved. The input metrics may include, without limitation, a specific action that has been taken (e.g., post social media with a certain frequency) or a specific state (e.g., company has one million followers). The result metrics may include a state that is determined to be impacted by one or more of the input metrics. For example, the model may assume that posting three times a week is correlated with increasing the number of followers of a company by a number X and that posting four times a week is correlated with increasing the number of followers of a company by a number Y. Other numbers of assumptions may be used as well, and other types of input and result metrics may be used based on this example.

Over time (e.g., each time new data is available and/or when the models are updated), the system may observe various companies (which may or may not be done in a domain-specific and/or other subset of companies manner) that post three times a week and companies that post social media four times a week. The system may correlate the number of posts made with the number of followers that resulted within an amount of time after the weekly social media posts. As the model is updated the assumptions may be revised based on empirical data. For instance, the numbers X and Y may be revised as new data is used to train the model. In this manner, the strategy suggestion generator 128 may continuously learn as data is added to (i.e., observed by) the system.

In some implementations, the foregoing learning and intelligence may be applied system-wide and applied to all companies across multiple domains. In some implementations, the foregoing learning and intelligence may be domain-specific. For example, each industry may be associated with its own set of one or models that are applied to all companies in the industry. In some implementations, the foregoing learning and intelligence may be specifically targeted to subsets within a domain. For example, a set of close competitors in an industry (as defined by the company or others) may be associated with its own set of one or more models. In some implementations, the foregoing learning and intelligence may be company-type specific, which may (or may not) be further domain-specific. For example, small, medium, large, and/or other sized companies (as defined by one or more parameters such as employee count, revenue, etc.) in a given industry may be associated with its own set of one or more models. As such, the learning and intelligence may be specialized for specific sets of companies or generalized for broader sets of companies.

For example, the strategy suggestion generator 128 may analyze metrics such as tweet frequency and suggest that the company should send tweets at least 3 times per week. If the company's tweet frequency is high, but they are still not attracting followers (i.e., not following the model's machine-learned prediction), the decision engine 126 may make other suggestions to increase the number of new followers, such as suggested the content to include in their tweets or other strategies that will increase their following. Such suggestions may be made based on observations of prior suggestions (including for other companies, whether or not in the same industry) and their effects on increasing performance with respect to the relevant channel. For example, based on prior suggestions or observations that a company that tweets 3 times per week increases their number of followers by a certain amount, the decision engine 126 may learn that such tweet frequency is likely to achieve a certain result (in this case, increasing the number of new followers).

According to one aspect of the invention, the decision engine may be the analytical part of the system that is taking the data it obtains and tries to determine if there are any actions that need to be taken on the data. The suggestion engine may formulate an action plan based on the data driven through the decision engine.

Companies using the system may sell products and/or services. Each product or service may have distinct properties that the strategy suggestion generator 128 uses to develop suggested actions. As such, the strategy suggestion generator 128 may obtain the user-defined rules to implement computer intelligence for making the strategy suggestions. As such, one company's strategy suggestions may differ from another company's strategy suggestions based on their user-defined rules, even though the computer intelligence used by strategy suggestion generator 128 is used to suggest strategies for both companies. These rules may relate to sales goal preference, monetary instrument preference, location preference, location reach, monthly demand quotient, event sensitivity quotient, customer loyalty programs, customer traceability and behavior recognition, market platforms and effectiveness indices, potential actions, discounts, correlation tracking, and/or other preference-based rules.

In some implementations, strategy suggestion generator 128 may generate multiple suggestions to achieve a certain goal. Each suggestion may be ranked with respect to other suggestions. For example, to increase a number of new followers, strategy suggestion generator 128 may have learned, from the internalized data, that a certain frequency of social media posts tends to increase the number of new followers. Likewise, strategy suggestion generator 128 may have learned that including certain content or formatting of the social media posts tends to increase the number of new followers. Strategy suggestion generator 128 may rank these and other suggestions with respect to one another for presentation to the company. Such rank may be based on the learned effectiveness of each. In some instances, strategy suggestion generator 128 may make a suggestion to do two or more of the suggestions.

In an implementation, the strategy suggestion engine 128 may suggest actions, such as marketing actions, that can be accepted or rejected by the company. For instance, the suggestions may be provided to the company via a dashboard, which is described further below. Via the dashboard, in some instances, the company may select whether or not to proceed with the suggestions. These actions may be bundled together as a group to form specific strategies. Various actions may be suggested based on real-time data from the various channels 101. As used herein, the term "real-time" may refer to receipt data by the strategy and suggestion engine 128 from the connectors 120 that triggers processing to generate a suggestion to perform an action. Put another way, in some instances, strategy and suggestion engine 128 may attempt to determine suggestions upon receipt of data relating to the company as monitored and aggregated from one or more of the channels 101.

As such, a suggested action typically, though not necessarily, involves a channel 101, and an action to take within that channel. For example, a Facebook ad may be determined to be converting well (e.g., beyond a threshold value). Based on the conversion rate of the ad and information learned about ad conversion rates, the strategy suggestion engine 128 may determine a suggestion to "boost" the post. The strategy suggestion engine 128 may alert the company about the specific post with a recommendation to boost that post on the Facebook platform. After a user has selected the actions to implement within a strategy, the strategy may be marked with a start date/time so that the monitoring and reporting engines can identify changes to other data after the implementation of the strategy in order to calculate implementation results.

It should be noted that the suggestions may, in some implementations, be driven by user-defined rules (described above) that specify certain preferences of the customer. In this manner, the customer may specify certain strategies should be favored over others and the computerized intelligence of the system may make appropriate suggestions based on data monitored and learned relating to one or more of the channels 101. Thus, the system may make specific, customized suggestions for different companies using common intelligence learned from multi-domain and multi-company data from channels 101. Various types of suggestions may be implemented herein, examples of some of which will now be described.

In some implementations, the strategy and suggestion engine 128 can suggest pricing adjustments and discounts related to products and services. Optimal pricing calculations may be learned from observed demand, location data, profit margin, cost reductions, external compensation factors, and/or other data. The strategy and suggestion engine 128 may support various types of discounts, including fixed amount off, fixed percent off, spend x get y items free, spend x get y percent off, spend x get y items free, spend x get y amount, and/or other types of discounts. The strategy and suggestion engine 128 may also use rules that specify more complex discounts.

By way of example, actions for social media (depending on the platform) can include, Post, Post image, Post video, post audio, Share, Comment, Like, Bost Post, increase spend limit, decrease spend limit, and other actions. Actions for SEO may include things like include H1 tags in each of your webpages that indicate clearly the content sections on the page and other actions. As will be appreciated by one of ordinary skill in the art, a large matrix of potential actions are possible.

In some implementations, strategy and suggestion engine 128 may obtain external data from one or more data services to factor such data into its suggestion. The external data may include, without limitation, weather information, traffic information, current event information (including political, local, sports, etc.), and/or other types of data that is external to the system. In some instances, external data may be obtained from the one or more channels 101 (e.g. obtain weather information from social media posts) or outside the one or more channels 101 (e.g., obtain weather information from a weather service).

For implementations that use external data, strategy and suggestion engine 128 may use the external data as a parameter in its modeling. For example, weather information may be correlated with actions and results in a model. In a particular example, strategy and suggestion engine 128 may learn, from the internalized data and the external data, that inclement weather hampers a particular company's business (or the business of industry to which the company belongs). In other words, strategy and suggestion engine 128 may correlate various observed weather conditions with observed business performance (e.g., sales) and observed actions (e.g., marketing activities). Using the modeling, strategy and suggestion engine 128 may suggest that the company suspend certain actions such as marketing activities because their effectiveness during inclement weather is reduced (e.g. deviating from a threshold amount) and external data indicating that inclement weather is expected. In some instances, strategy and suggestion engine 128 may make time-bound suggestions, such as to suspend marketing activities for four days until the inclement weather is expected to pass. Because strategy and suggestion engine 128 may operate in real-time, these and other suggestions may be updated based on updated internalized data and/or updated external data (e.g., revised weather forecast).

Customer Traceability and Behavior Recognition

In some implementations, strategy and suggestion engine 128 may use preference and behavior data of a company's customers in its decision calculations if available. The strength of this data may vary based on availability. For example, if purchases are not anonymous (e.g., tied to a customer identifier) and there is the ability to associate a customer's social media accounts with their buying habits, strategy and suggestion engine 128 may perform behavioral analysis on preferences, habits, demographics, colors, typical spending patterns, and other data that may be useful to developing an effective strategy aimed at customers who are more likely to convert into sales. In cases where there is more limited data available (e.g., no customer identity), the strategy and suggestion engine 128 may generally classify customers, identifying demographic groups, locations, and other information that will likely result in a bias toward conversion.

Marketing Platforms and Effectiveness Indices

In some implementations, strategy and suggestion engine 128 may assign an effectiveness weight for each channel 101. This is because a given set of channels 101 that a company uses may be more effective at achieving certain goals than others. Strategy and suggestion engine 128 may use data learned from internalized data, external data, and/or other information to determine which channels 101 are effective at achieving certain goals. Such determinations may be domain-specific. For example, based on the internalized data, external data, and/or other information available to the system, strategy and suggestion engine 128 may determine that a given social media platform is effective for gaining recognition and selling consumer goods but may be ineffective at selling abstract products and services, such as mortgages. The strategy and suggestion engine 128 may assign a weight to the effectiveness of various channels (including sub-channels) based on the company business model to bias its suggestions toward to the most effective channels for the company.

As previously noted, the strategy and suggestion engine 128 may use user-defined rules to identify particular suggestions consistent with the company preferences. Non-limiting examples of such rules that specify preferences will now be described. Other preferences may be specified in the rules, as would be appreciated based on the disclosure herein.

Sales Goals Preference

For each product or service a company sells, it may have a scaling of goals related to those sales transactions. These goals may extend beyond simply the primary goal of selling a given product or service. There may be external partners involved in a transaction that the seller would like to prioritize in regards to their marketing efforts. An example of this sales goal prioritization would be an automobile seller that receives commissions or other compensation from funneling their customers through a particular financing company. Another example may be a retailer that receives beneficial volume pricing from a wholesaler for certain products, and this expected supplier discount allows the retailer increased margin and pricing flexibility in their marketing campaigns. The strategy and suggestion engine 128 may support calculation of the following sales goals: external partner commissions after sales; supplier volume discount pricing and volume thresholds for those price adjustments; location specific margin benefits; advantageous public subsidy or tax preferences; external ancillary costs associated with the transaction that reduce profit margin; other external after-sale compensation; and/or other sales goals.

Data is collected by the system regarding these preferences per product or service offered, and preference ranking is applied to each based on benefit to profit margin. The strategy engine utilizes this prioritization when generating suggestions.

Monetary Instrument Preference

Many businesses have preference in regards to which monetary instrument should be used in sales transactions. The most common preference is cash versus credit card transactions in order to avoid fees imposed by banks and card providers. However, there may be other monetary instruments that are preferable for exchange, especially in online transactions, such as PayPal or even Bitcoin. The strategy and suggestion engine 128 may support an various types of monetary instruments, and the system itself is agnostic except for the preference rank of the instrument. Monetary instruments available for transactions are set as part of the company onboarding process (e.g., specified by the company), and ranking is based on input given from the customer.

Location Preference

Different products or services may only be available in one location or even restricted for sale in another location. There also may be times where a business may want to weight marketing efforts for certain products or services more heavily in one area versus another. The possible reasons for location preference are vast, and the customer is allowed to control these location preference within the system and can adjust their location weighting at any time. Neutral weighting is the default setting which does not give any location preference over another, but once location preference are selected, they can be assigned at the product and service level to instruct the system to drive marketing for specific products or services toward one location versus another.

Location Reach

Another location preference that is not prioritization or ranking is estimated reach. This metric is designed to be used with localized products or services where there is a maximum limit on the possible customer base. This allows the strategy engine to set geographical boundaries for marketing efforts in cases where localized products or services are rendered or when there is delivery involved in the transaction. The strategy engine can use this data to weight marketing efforts toward areas that have the greatest reach and potential customer base while avoiding spending marketing resources outside of potential customer areas.

Monthly Demand Quotient

Each product or service has a typical pattern of demand that can be visualized over a time series. The monthly demand quotient is calculated for each product and service based on real-time sales data. It allows the strategy engine to baseline a "normal" demand index that it can use to determine whether demand is trending upward or downward, either naturally or as a result of marketing actions and system suggestions. The strategy engine uses this quotient to demine demand changes both positive and negative to sense trends. In turn, it uses these trend calculations to determine strategy suggestions as well as the effectiveness of suggestions already made.

Event Sensitivity Quotient

Certain products or services offered by a business have their demand curves easily influenced by external events. The direction of these influencers may be positive or negative and different types of events may have varying degrees of influence strength. For example, a company that offers snorkeling tours is strongly influenced by weather related events. If there is bad weather in the forecast, it will likely significantly impact the marketing strategy related to those services. On the positive side, a local restaurant located near a major convention venue may see a heavy increase in demand during periods when events are held in the convention center. The strategy engine is able to use these events along with their relative strength index in order to determine the impact of events on demand for certain products and services. The strategy engine can then adjust its suggestions based on estimated demand change for these events. Events and sensitivity indexing are assigned during the onboarding process based on data collected from the customer, and those values are updated as the system monitors sales data during runtime. The application is largely agnostic to specific events, but it does know the type of event and their strength index. IT also uses publicly available data from weather, news, and financial APIs in order to obtain forecast data for events such as inclement weather, interest rate changes, and geopolitical risks.

Customer Loyalty Programs

The strategy and suggestion engine 128 may support computation of customer loyalty program cost/benefit data for the purposes of marketing strategy. The system may support points accumulation logic, membership tiers, free items, escalating tier discounts, and most other loyalty program schemas. The strategy and suggestion engine 128 may use customer loyalty program data in combination with tracking data on enrolled customer purchases in order to bias its suggestions toward or away from loyalty members depending on the goal of the marketing effort and the profit margin.

Dashboard

In an implementation, dashboard generator 130 may generate a dashboard (e.g., a visual interface) that provides a company with an integrated set of interfaces for its marketing performance data, scores and sub-scores, strategies suggested by the system, and/or other information related to the system. In some instances, the dashboard may include various display options for a company to configure its connectors 120. As such a given connector 120 may be customized by a company for use in data aggregation for the company.

Figure 4:
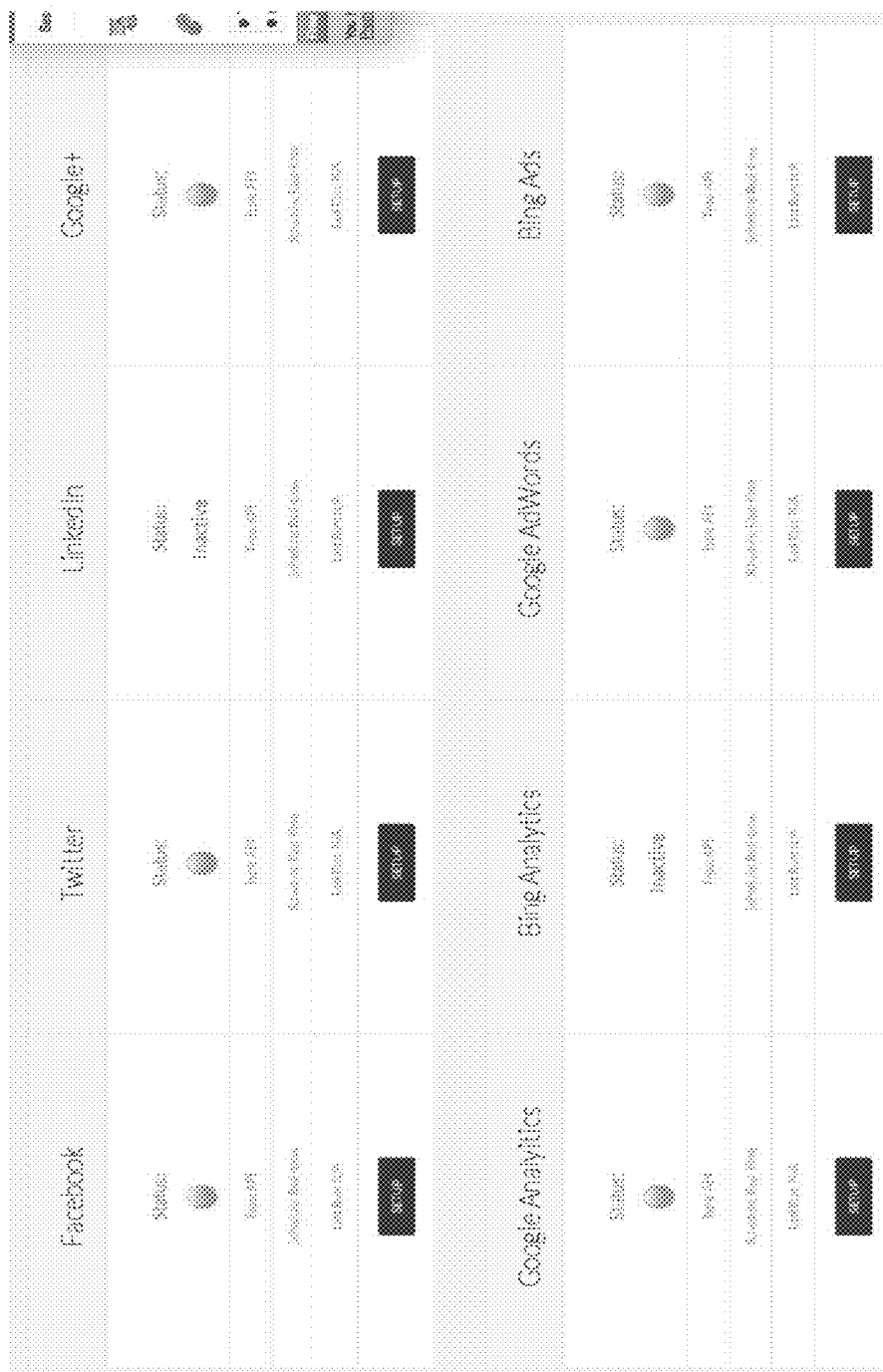
FIG. 4 depicts a screenshot of a dashboard interface for configuring channels for data connectors, according to an implementation of the invention.
Figure 5:
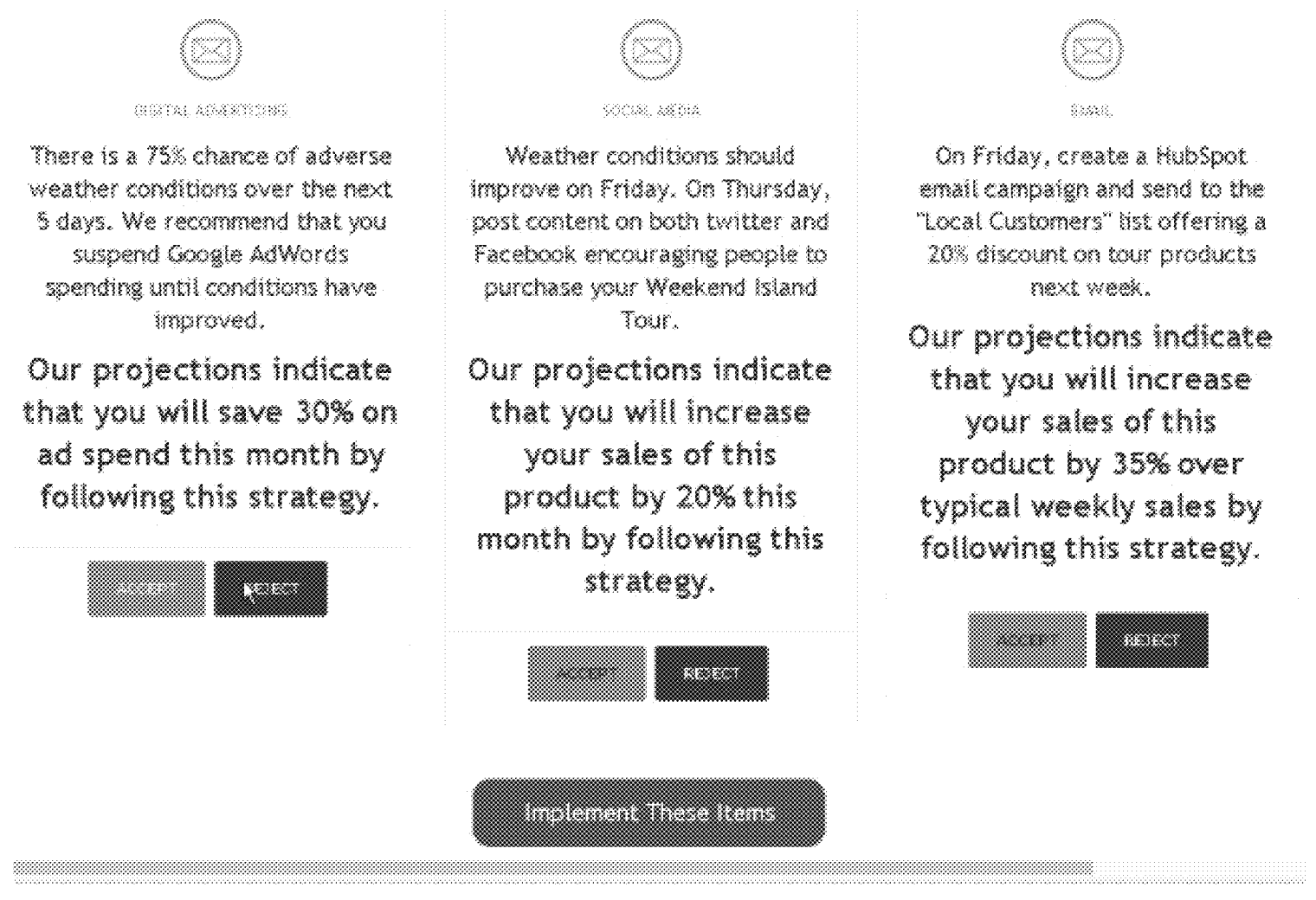
Figure 6:
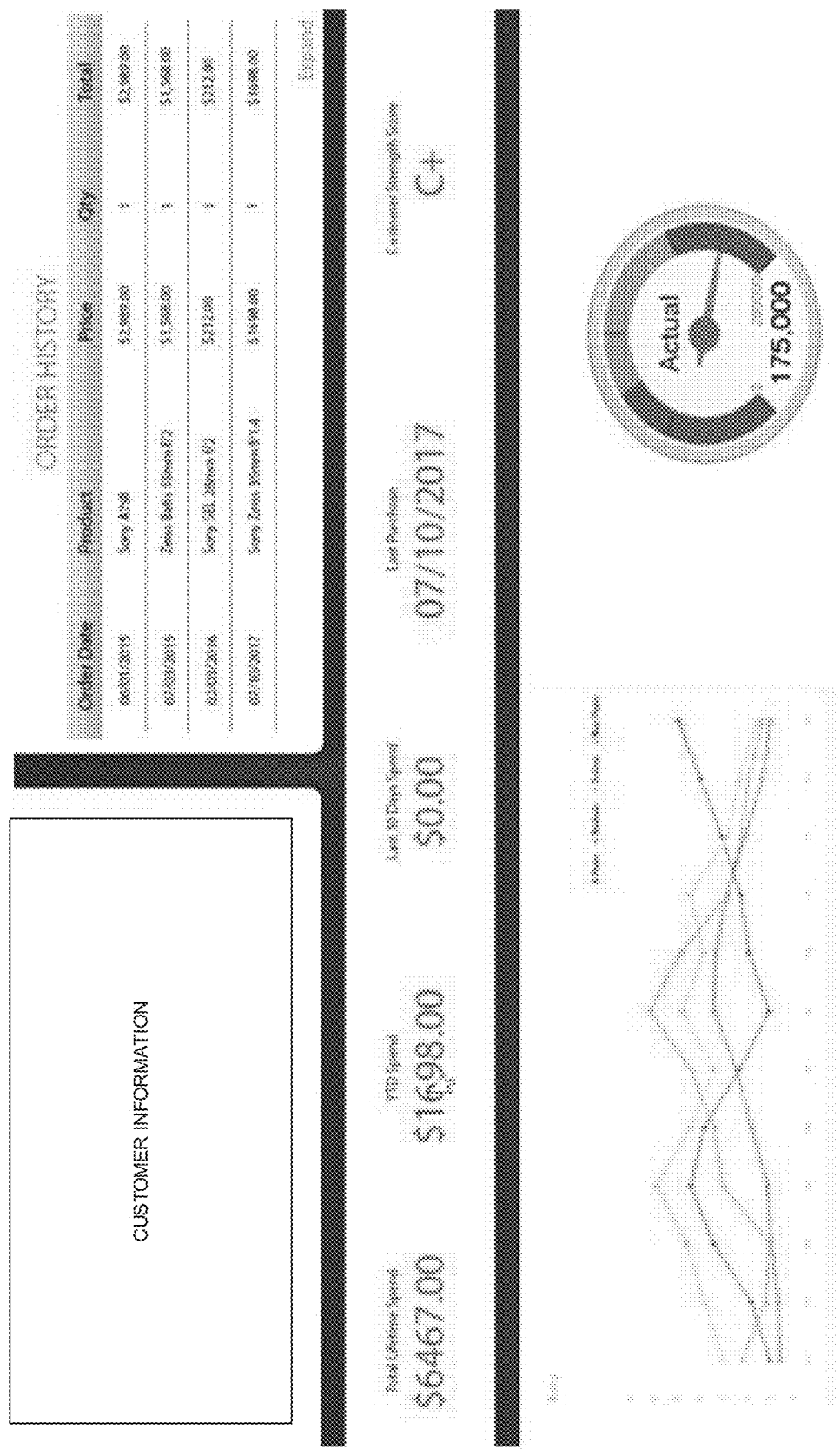
FIG. 6 depicts a screenshot of a dashboard interface for displaying customer-specific information of a company, according to an implementation of the invention.

In various implementations, the dashboard may include various display options to modify the user-defined rules for implementing the computerized intelligence (i.e., selecting or directing strategies derived from the computerized intelligence). Various examples of dashboard interfaces is illustrated in FIGS. 4-6.

Strategy Implementation and Monitoring Engine

In an implementation, strategy implementation and monitoring engine 132 may implement a suggested strategy in response to an acceptance by the company (e.g., via the dashboard) of the suggested strategy. Alternatively or additionally, the strategy implementation and monitoring engine 132 may implement a strategy automatically without an explicit acceptance of the strategy for the company. For instance, the company may agree to automatic strategy determination and implementation, in which case strategy implementation and monitoring engine 132 may automatically implement a strategy without explicit company acceptance. Strategies may be implemented manually, in an automated fashion or by a combination of the two.

In an implementation, strategy implementation and monitoring engine 132 may monitor the results of the strategy implementation in order to learn from the results and develop better strategies. The results may facilitate continuous feedback loop and machine learning. As the system acquires additional data, it will be able to use that data to make comparative analyses on other businesses who have implemented similar strategies and determine what has the highest probability of working best for different types of companies across different types of industries. For example, the strategy implementation and corresponding result may be fed back into the models that correlate actions, results, external data, and/or other information used to learn from and develop strategies described herein. In some instances, such monitoring may also include re-scoring some or all channels, and the overall score. Such re-scores may trigger additional or alternative suggestions.

AI Portal

In an implementation, the AI portal 134 may provide one or more interfaces, such as graphical user interfaces, to obtain goals, datasets, business processes, and/or other training parameters for training a model or otherwise creating a company instance for modeling. As such, the company may specify its goals and provide information used by the system to learn how to achieve those goals based on machine learned models trained and refined by the AI engine 136.

Machine-Learned Goal Achievement Through Trained Modeling

In an implementation, the AI engine 136 may implement machine learning to achieve the goals set by the company by identifying and taking various actions designed to achieve those goals, monitoring the effectiveness of those actions, and learning from the monitored actions to refine models generated for the company. For example, the AI engine 136 may identify marketing operations for achieving marketing goals set by the company, monitor the marketing operations, and learn from the effectiveness of the marketing operations. To do so, the AI engine 136 may train models for each customer instance based on the customer's goals, datasets, business processes, and/or other training parameters. In some instances, customers that share similar goals, datasets, business processes, and/or other training parameters may be grouped together and use common models, thereby leveraging training datasets from similar customers. The models may be refined over time based on monitoring the actions taken and their effectiveness.

The AI engine 136 may train the models by creating goals for the customer instance, assigning potential actions to achieve the goals, determining event sensitivity, measuring effectiveness (e.g., success) of the actions, monitoring success metrics, altering future system behavior, and/or using other processes. Creating goals may include setting a goal priority for the goals and setting rules that alter goal prioritization. Assigning potential actions may include creating actions based by defining action properties (which may include setting ratios and correlations between property values and creating forecasting models for action properties), defining action sequence, defining action start time content, defining action duration, determining cost of actions (which may include determining one-times cost vs. ongoing costs and diminishing costs over time), and determining action targets. Determining event sensitivity may include identifying external factors that affect the outcome of goals and modifying action selection based on event sensitivity. Measuring success may include defining goal success and defining success measurement mechanisms. Monitoring success metrics and altering future system behavior may be based on correlated data metrics and cause and effect analysis.

Creating and Prioritizing Goals

The AI engine 136 may obtain a definition of one or more goals to be achieved. A goal may be a defined state that can be measured. For example, a goal may be to achieve a certain number of sales in a given period. That goal can be measured to determine whether the goal can be achieved.

For instances in which more than one goal is to be achieved, each of the goals may not have the same priority. The AI engine 136 may use computer executed rules for establishing priority values for each goal. For example, a used car lot may have a primary goal to sell cars, but it may be most profitable to sell cars through a preferred lending partner. The AI engine 136 should bias marketing efforts toward the most profitable goals and therefore prioritize such goals. In this example, the AI engine 136 may generate a first goal for "Selling cars through preferred lending partner" with a priority value of 1 or other priority indicator. The AI engine 136 may generate a second goal for "Selling cars to customers with independent financing or with cash" with a priority value of 2 or other priority indicator to indicate a lesser priority than the first goal. Both goals may be important to achieve (e.g., because they have been defined by the company), but the AI engine 136 may use the priority values to determine which goals should be favored over others. For instance, the AI engine 136 may expend more compute power, such as attempting and monitoring more actions, for achieving goals with higher priority values than those with lower priority values.

In some instances, goals may also have the same prioritization, or a mix of goals with the same prioritization within the scope of all goals. For example, the car dealer may have no preference as to whether he sells cars or trucks. Therefore, goals for selling car inventory units or truck inventory units may possess the same prioritization value within the system. Again, the dealer may have no preference for selling cars or trucks, but may have a preference for selling new cars and trucks versus used cars and trucks. In this case, the goals could be created in the system for selling new cars or trucks with a priority value 1, and goals related to selling used cars or trucks with a value of 2.

Changing Goals

In some instances, goals may not be static, but may change over time depending on certain conditions. The AI engine 136 may account for the realignment of goals based on certain calculable parameters.

Time Context

In some implementations, goals may have certain time context properties where their prioritization changes based on the time of year or even the time of day. This is especially true of seasonal products and services. For example, a landscaping firm may have a goal of selling lawn cutting services with a priority value of 1 during summer, but during the winter that goal priority value may shift to 0. Another goal, selling snow removal services which has a prioritization level of 0 during the summer, shifts to a value of 1 during the winter. As such, the AI engine 136 may implement time-based rules for altering goals depending on the time of year, passage of time, and/or other time-based factors.

Goal Dependency

In some instances, goal prioritization may change based on the condition of another goal and/or the state of the current goal itself. For example, a mobile phone seller may receive a volume commission from a particular carrier if they sell at least 500 units in a month. After hitting that goal, it becomes diminishing returns to continue selling for the same carrier, and marketing efforts should be diverted to another carrier. In this case, the AI engine 136 may implement a first goal of "Selling mobile devices on Carrier X—500 units" with a priority value of 1. After that goal has been measured as achieved/successful, AI engine 136 may implement a goal prioritization shift that updates the original priority value of 1 to a new priority value of 2. Alternatively or additionally, the AI engine 136 may increase the prioritization value for goals relating to other carriers to 1.

Assigning Potential Actions

Defining Actions

In an implementation, the AI engine 136 may determine one or more actions to use based on data analysis. In some instances, the AI engine 136 may determine an order of the actions to be taken based on the data analysis. Each action may be associated with one or more action properties that define the action. To illustrate the foregoing, a simplistic example of boiling water will be used. In this example, the goal is singular: To boil water. The actions to achieve this goal may be "Apply heat energy to a container of water". There may be numerous variables that will affect the outcome. The AI engine 136 may account for these variables when determining one or more actions to take. In some instances, AI engine 136 may account for these variables when determining an order of the actions to take.

Action Properties

One of the action properties to potentially consider is the water itself. Water with salt added will actually boil faster than plain water. However, if the properties of the water are manipulated such as by adding salt, the goal itself is manipulated because the goal has changed from boiling water to boiling a water-based solution. As such, the AI engine 136 may assume that changing the properties of the water is not an action available to the system. However, many other factors are variable, starting with the container. Changing the material of the container will have an impact on the speed at which the goal of boiling water is achieved. Applying heat energy to containers of aluminum, stainless steel, or cast iron will all effectively boil water, but will result in variations in the amount of time it takes to achieve the goal. The AI engine 136 may determine that the first action of placing water into a container. This action may have adjustable properties: 1. volume of water, 2. size of the container, and 3. container material. Changes in the values of any of these properties will have direct impact on the outcome of the goal.

Action Forecasting

In an implementation, the AI engine 136 may determine which properties to adjust? To do so, the AI engine 136 may implement trial and error with different values for each of the properties. For instance, the AI engine 136 may recommend taking different actions with varying incremental values for the properties an different ratios of property values, measuring the outcome of each in order to arrive at the optimal settings for goal achievement. However, this process may be costly when applied to large datasets or several variables. For example, this approach would require purchasing different types of containers of various sizes plus the time cost of actually attempting to boil water in various combinations of volumes and containers. In order to avoid the trial-and-error cost, the AI engine 136 may make estimates on outcomes using mathematical models in order to optimize action selection. This AI engine 136 may do so by utilizing knowledge of what is known about the properties and the relationships between them. For instance, there are well-established mathematical formulas for heat conductivity of different materials. Using these metrics, the AI engine 136 may create formulas to forecast the effect of changing property values such as water volume and container material without actually having to absorb to cost of a trial-and-error test. In the absence of a mathematical forecasting mechanism, however, the AI engine 136 may implement a trial-and-error mechanism.

Action Property Value Correlations and Ratios

Whereas the heat conductivity formulas may permit the AI engine 136 to forecast the effect of container material in relationship to the goal to boil water, other property values, such water volume and container size, have relationships to one-another. The higher the water volume, the larger the container necessary to hold it. This ratio may be readily determined and creates a dependency between the two variables. As one variable increases, the other variable must also increase alongside it. These ratios may be defined in the action so that the AI engine 136 does not attempt to recommend a volume of water too large for its container size.

Action Sequence

In an implementation, when more than one action is determined to be taken, the AI engine 136 may determine a sequence of the actions to be taken. The AI engine 136 may generate an action definition that specifies actions to be taken, their properties and their sequence. In the water boiling actions, the action definition may include:

(Entry 1) action=Place water into a container, where the action properties include WaterVolume=1 liter, ContainerVolume=1.5 liters; ContainerMaterial=Stainless Steel, Sequence=1.

(Entry 2) action=Acquire heat energy source, where the action properties include HeatSourceType=Natural Gas; MaxBTUs=60000; Sequence=2

(Entry 3) action=Apply energy from heat source to water in container, where the action properties include EnergyOutput=40000 BTUs; Sequence=3.

The foregoing action definition and its Entries 1-3 may be stored in a computer-readable format such as eXtensible Markup Language ("XML"), in which the action, action properties, and Sequence may be encoded using XML tags, and/or other computer-readable format.

In some instances, there may be goals in which the order of actions is inconsequential, and in those cases Sequence values should be set to 0. For automated action implementations, in order for the system to support an action sequence, it will also be necessary to define an action completion metric for which the AI engine 136 can measure whether or not an action has been completed. If there are no action completion metrics defined, the AI engine 136 may require manual intervention.

Action Timing and Duration

Actions may have a time context in that they are started at some point and performed for a specified duration. Actions may be either executed with no preference to their start date/time, or they may be executed at some point in the future at a specified point-in-time. The AI engine 136 may attempt to determine the optimal start date/time for a recommended action. This is especially true for actions such as posting on INSTAGRAM in which post engagement is sensitive to the time of day which the post was made. Actions can also be recurring, although the system currently does not offer recommendations on recurring actions. A recurring action, for example a blog post every Monday morning, would be recommended by the system as "Create blog post" potentially every Thursday with a recommended start time of the following Monday. In its current form, the AI engine 136 may not construct a recommendation of "Create blog post every Monday."

In regards to action duration, one-time actions (e.g. acquiring a heat source) may have a value of 0 for duration because they are intended to be performed once or the duration has no effect on outcome. However, actions such as "Apply energy from heat source to water in container" may have important duration values since the amount of time energy is applied to the water has a very high impact on goal outcomes. The AI engine 136 may determine optimal values based on a trial-and-error approach, but again may be quite costly. Thus, AI engine 136 may once again use mathematical forecasting to make more accurate and focused recommendations. By defining mathematical forecasting formulas for the action property values, the AI engine 136 can run simulations to determine the property values with the highest probability of most effectively achieving the goal.

The duration or start date/time of some actions may be dependent upon the outcome of other actions. Static sequencing can be achieved by setting the sequence property of the action within the goal, but in cases where a different course of action may be taken based on the result of another action, the system may be configured with linked actions. A linked action does not have a scalar sequence value, but rather derives its sequence value from the output of another expression. For example, if the goal of boiling water has not been achieved within a duration of 5 mins, a new action of type "Apply energy from heat source to water in container" may be executed with an EnergyOutput value of 45000 BTUs, which has the affect of increasing the heat energy applied to the water. This action would not be executed at all unless the water took more than 5 minutes to boil.

Determining Cost of Actions

Cost analysis of actions may be a complex process and requires the AI engine 136 to consider a wide variety of variables, but may be important in determining whether or not an action is classified as effective. For example, it may be possible to boil water quickly by using a rocket motor, but the cost is so high as to make the action impractical. Therefore the AI engine 136 may evaluate the cost of each action along with its trade-offs compared to alternative actions in order to properly recommend the best set of actions to a achieve a particular goal.

In the boiling water example, each action may be associated with a cost. Containers made from different materials will have different associated costs. A solid gold pot may have great heat-conductivity, but it is not a cost effective solution for boiling water. Copper has superior conductivity to stainless steel, but it is also higher cost. The AI engine 136 may use its mathematical forecast models coupled with cost formulas for different materials to determine which material is truly the most cost effective solution for building water. While container cost would be a one-time cost, other costs are variable. A good example would be the fuel cost of the action "Apply energy from heat source to water in container". Different fuels such as electricity and gas will have different ongoing costs at runtime. Depending on the energy input and duration, there will be a formula rendered as cost per second for the AI engine 136 to calculate the estimated total cost of the action based on the duration.

Another cost consideration the AI engine 136 may analyze is diminishing costs of an action as it is distributed over future actions. An example of this is the action "Acquire heat energy source" which is really the act of purchasing an electric range, gas stove, gas burner, etc. This action has a high up-front cost, but the cost per unit of output becomes lower every time it is used to boil water in the future. Therefore, the AI engine 136 may determine the probability of future uses and estimate the frequency of future uses to estimate how the cost of this action will to be distributed per unit of output over the estimated lifespan of the heat source. Of course, there is a wide range of costs depending on the type of heat source acquired; so the AI engine 136 may be provided with budgetary boundaries within which or operate, or it can be informed to ignore the cost of an action, as in the scenario of when a heat source has been previously purchased and does not need to be acquired. The AI engine 136 may evaluate all these factors and trade-offs when determining which actions to recommend to achieve goals.

Action Targets

In some implementations, an action may be a targeted action. A targeted action is one in which the action is to be applied to a specifically defined set of recipients. In the boiling water example, the action "Apply energy from heat source to water in container" is a targeted action. The action must be performed on the target container. In a marketing context, a targeted action may include sending a specific email to a target demographic or boosting a specific Facebook post. In this case, the AI engine 136 may perform actions directed at a selected target. And the properties of the targets may change based on their response to the action. For example, the AI engine 136 may recommend changing the container material based on its response to heat energy in the boiling water example and send a different email, and/or change the target demographic in the marketing example.

Externalities and Event Sensitivity

Certain external factors may influence the outcome of actions. For boiling water, the primary external influence may be barometric pressure, most commonly referenced by altitude. The AI engine 136 may take these external or environmental factors into account in order to provide better recommendations. The AI engine 136 may support different levels of sensitivity for how much pressure the external variable applies to a certain product or service. The sensitivity scale may be −10 to 10 with −10 representing highly negative sensitivity to an external factor and +10 representing a high positive sensitivity to an external factor. For example, a snorkeling tour operator offers products and services that are highly sensitive to weather related events. Rain would indicate a −10 for actions related to Google AdWords marketing since it is highly unlikely that people would be searching for snorkeling tours when it is bad weather; so the system may recommend pausing all AdWords campaigns until weather improves. This of course requires the system to have those sensitivities defined and data sources connected from which to evaluate the current state of those external events. Other values and representations of sensitivities may be used as well or in addition to the foregoing example.

Measuring Success

Goal Success Definitions

In order for the AI engine 136 to determine whether or not a goal has been achieved, it is first necessary to define success. In our example of boiling water, it is necessary to define what boiling water actually means so the system can determine whether or not the goal has been achieved. In this case, boiling water should be defined as the water temperature reaching 212 degrees Fahrenheit.

Goal Measurement Processes

The AI engine 136 may also determine goal success by defining a measurement mechanism for the goal. If the goal of boiling water is defined as the water temperature reaching 212 degrees, the AI engine 136 must define a mechanism to measure the temperature of the water. This measurement process would be defined as when the reading of a thermometer submerged at least 1 inch into the water and not in contact with the container reads greater than or equal to 212 F. The AI engine 136 may then monitor the thermometer output and determine the success of the goal and record other measurements about the action property values, duration of the actions, etc. Of course other external factors such a barometric pressure come into play in measurement and may change our measurement success definition depending on formulas which can be evaluated to curve our success measurement based on the impact of those external factors.

Once goals, potential actions related to those goals, external factors to which the goal is sensitive, success and success measurement have been defined, the AI engine 136 may be properly trained and will begin to make decisions on actions to achieve its goals.

Monitoring and Machine Learning

In runtime operation, once an action is taken, the AI engine 136 may monitor the results of the related goals in order to determine whether success has been achieved. If success has been achieved, the AI engine 136 may compare the parameters of that success with other action sets taken to achieve that same goal to see which action parameters are most effective, i.e. which action property values achieved success in the shortest timeframe balanced with the lowest cost. The AI engine 136 may also compare the results achieved with any mathematical forecasting and simulation performed prior to suggesting the action to see how the actual outcome correlates with the forecasted results. The AI engine 136 may use the results of this analysis to modify its future recommendations related to the goal.

Correlation vs. Causation

The AI engine 136 may monitor and record thousands of data point correlations before and after the execution of an action. The AI engine 136 may observe the deltas in every data metric within its scope in order to determine if correlated value movements after a particular action is performed. For example, if an action of a Facebook post is taken, the AI engine 136 may observe a 15% increase in Google AdWords conversions 80% of the time. As time goes on and the more data available to observe, the strength of those correlations may increase or decrease. However, observing two independent variables that have correlated movements is not necessarily the same as causation. In our example of Facebook posts and Google AdWords conversions, it can only dogmatically be said that there is a strong correlation between those two elements and not necessarily a causal relationship one direction or the other. However, the AI engine 136 may still use these correlations in its forecasting of action results if they hold up over time and retain their strength. In this case, the AI engine 136 may anticipate a high probability of movement in these correlated values and even be able to probabilistically estimate the magnitude of that movement, and use those correlations in its action recommendations even if clear cause and effect cannot be determined. The AI engine 136 may not distinguish whether or not the relationship is causal or correlative, only that it is a strong correlation that holds true over time (e.g., some predefined minimum length of time), and thus can be relied upon for forecasting outcomes. The AI engine 136 may continue to rely on those correlations until they begin to break down, at which time the AI engine 136 will devalue those correlations in its forecasting analysis. As such, casual relationships do not actually matter because the AI engine 136 can rely on the correlations to persist even if it does not understand why they exist.

However, correlative analysis is not as definitive as true cause-and-effect. Correlations break down, or there may not be enough data history to determine real correlation strength, or external factors may skew correlations. Relying on correlative data may be reasonably acceptable if that is all the data available, but true cause and effect is a much stronger base for accurate forecasting. The challenge is that is very difficult for a machine to determine cause and effect. However, the AI engine 136 system can determine cause and effect relationships in certain instances, and uses a hierarchy of strength with analyzing metrics for action forecasting and recommendation.

Cause and Effect

The strongest level of strength is cause and effect. Different action models have pre-known casual relationships. For example, there is direct casual relationship between a Facebook post and Facebook likes. A Facebook post is going to have the effect of generating some level of engagement, the system just then has to use historical and correlative data to estimate the magnitude of engagement.

Another way to determine cause and effect is by observing the function of laws that we know for sure always are in operation. For example, the law of gravity is always in operation. While high winds may be the cause of an apple releasing its grip from a tree, gravity is the ultimate cause of the apple falling to the ground. Gravity will cause objects to fall to the ground. Likewise, there AI engine 136 may identify immutable or at least highly reliable rules in the marketplace or even inside a certain industry that can be used to accurately predict the results of an action.

100% correlated data can also be interpreted as causal as long as the definition of the action is sufficiently granular. For example, if a force of (X) Newtons was applied to one side of a table in a certain direction, and a water bottle on the opposite side of the table with (W) weight and (N) distance to the edge of the table fell to the floor, it can be established that the action had an immediate causal relationship to the water bottle falling. Given the exact same set of parameters, the result would be the same 100% of the time.

Correlated Data

As discussed above, the next level of strength that the AI engine 136 system relies upon for forecasting is correlated data. Data points measured before and after an action have a certain positive or negative delta value or may have a 0 value if they remain unchanged. The consistency and range of the delta values after a certain type of action and the history length of how many times the action has been performed and the results have been measured determine the reliability strength of the correlation. While not as strong as cause-and-effect inference, highly correlated values can be used predictively to hold true a certain percentage of time depending on statistical probability. The AI engine 136 may constantly monitor the correlated values to determine if the correlations are losing strength or failing altogether.

Trial-and-Error Bayesian Statistics

In some instances, the AI engine 136 either may not have enough data or not have strong enough interpretation of the data to make accurate action predictions. In this case, the AI engine 136 may attempt trial-and-error actions to refine its predictions and establish a baseline for results from disparate actions. In the absence of data, the AI engine 136 may also implement Bayesian statistical analysis depending on the model and goals for which it is attempting to derive action recommendations. Though this method may be less reliable for forecasting, in the absence of more concrete data, it can suggest the probability of different possible outcomes that will at least provide a baseline for the forecasting the results of actions and making plausible recommendations.

Databases 160

The one or more databases 160 that store information including domain-specific knowledgebases, raw data from the channels 101, internalized data, external data, models for computerized intelligence, and/or other information accessible to the system. The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Client Devices 170

Client devices 170 may be configured as a personal computer (e.g., a desktop computer, a laptop computer, etc.), a smartphone, a tablet computing device, and/or other device that can be programmed to interface with computer system 110 (e.g., using the dashboard). Although not illustrated in FIG. 1, end user devices 140 may include one or more physical processors programmed by computer program instructions.

FIG. 2 depicts a process of an artificial intelligence system for analyzing and increasing effectiveness of multi-channel data marketing strategies, according to an implementation of the invention.

In an operation 202, process 200 may include aggregating, by the plurality of networked data connectors, information indicating activity on the plurality of networked electronic channels, wherein at least a first networked data connector obtains information from a first networked electronic channel.

In an operation 204, process 200 may include update a computerized intelligence model based on the aggregated information, wherein the computerized intelligence model correlates one or more input metrics with one or more result metrics to automatically learn from the aggregated information, wherein a first input metric is correlated to result in a first result metric.

In an operation 206, process 200 may include retrieving, from the data storage device, one or more user-defined rules defined by an entity that define preferences for selecting one or more marketing actions to be taken with respect to one or more of the plurality of networked electronic channels.

In an operation 206, process 200 may include identifying, for a first entity, at least a first result to be achieved by the one or more marketing actions via at least the first networked electronic channel based on the one or more user-defined rules.

In an operation 208, process 200 may include correlating, via the computerized intelligence model, the first result to be achieved with the first result metric and the first input metric with a first marketing action to be taken.

In an operation 210, process 200 may include generating a suggestion for the entity to take the first action.

In an operation 212, process 200 may include providing the suggestion via a dashboard interface.

Figure 3:
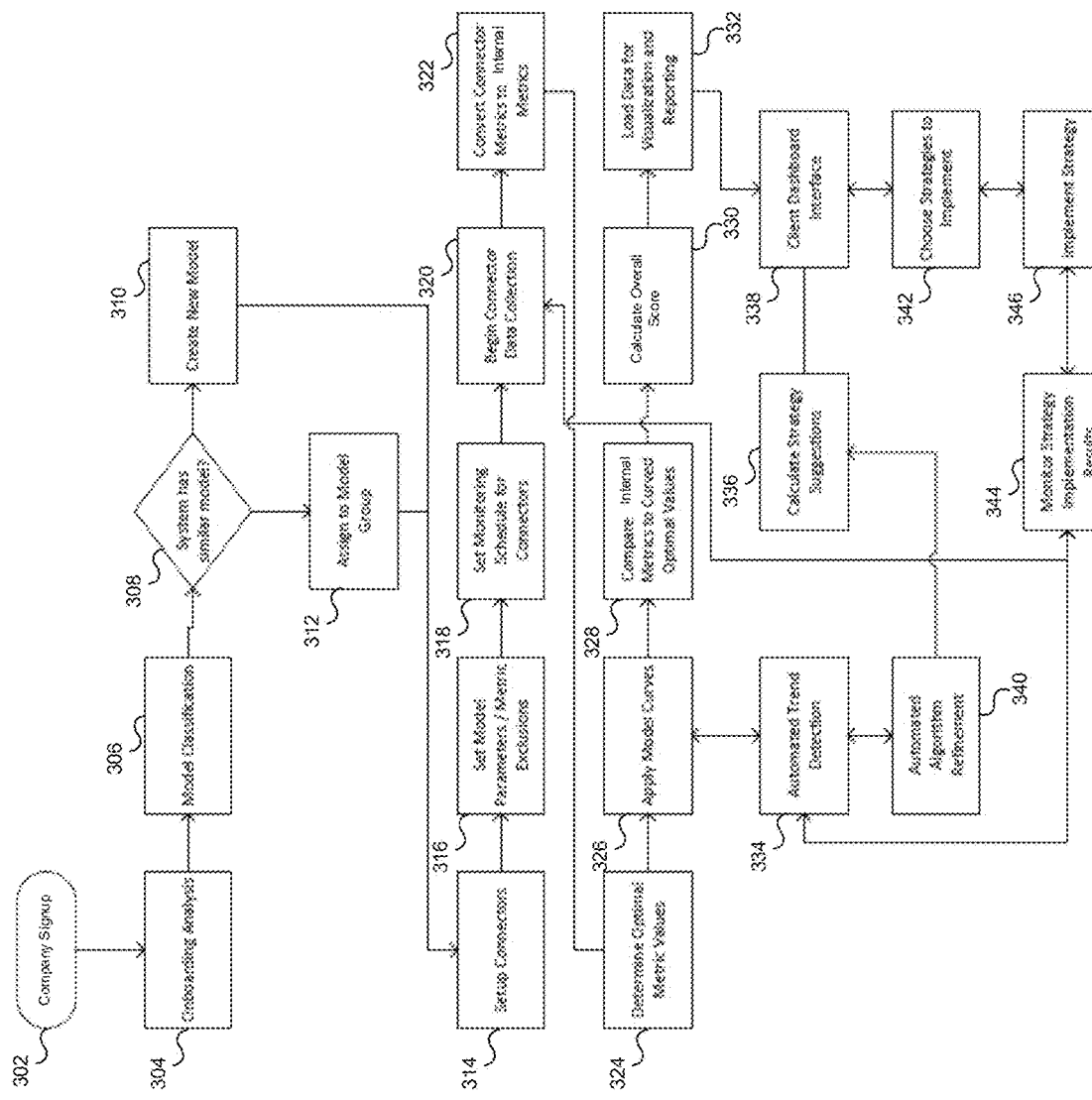
FIG. 3 depicts an overall process for analyzing and increasing effectiveness of multi-channel data marketing strategies for an entity, according to an implementation of the invention.

FIG. 3 depicts an overall process 300 for analyzing and increasing effectiveness of multi-channel data marketing strategies for an entity, according to an implementation of the invention.

In an operation 302, process 300 may include registering a company to use the system. For example, during a company signup operation, the company may specify channels 101 currently used for its marketing activities, credentials for such channels (to the extent that the company authorizes the system to act on its behalf with respect to those channels), user-defined preferences, channels 101 it wishes to target for marketing activities whether or not such channels are currently used by the company, domain information such as the industry in which the company belongs, location information that specifies one or more locations of the company, and/or other information relating to the company.

In an operation 304, process 300 may include performing onboarding analysis. Such analysis may include analyzing the company's user-defined rules, goals, domain, and/or other information.

In an operation 306, process 300 may include a model classification process during which a model for the company is generated based on the analysis from operation 304 and classified.

In an operation 308, process 300 may include determining whether the generated model already exists for the company (e.g., a model used for similar company types and/or domains).

In an operation 310, if the model does not already exist in the system, process 300 may include adding the model as a new model (thereby creating a new model).

In an operation 312, if the model exists in the system, process 300 may include adding the model to a model group. A model group may be a classification of businesses that fit into similar business models (e.g., they sell the same types of products or services, and/or operate in similar ways). Individual models differ based on business processes to further refine the concept of a model. For example, there may be a Model Group of "Auto Sellers" that includes a collection of businesses that sells cars, but inside of that model group there may be different business models, like franchise dealerships, individual used car lots, fleet sales companies, etc. Optimal values may be determined initially based on preloaded industry research and best estimates, but the system over time will determine and refine its own optimal values based on the data it obtains and analyzes across the businesses on the platform.

In an operation 314, process 300 may include setting up connectors 120 for the company to connect to the channels 101 relevant to the company. Such connectors 120 may be reused or customized for the company.

In an operation 316, process 300 may include setting model parameters and exclusions for the company based on, for example, the user-defined rules, domain information, and/or other model related data.

In an operation 318, process 300 may include setting a monitoring schedule for the connectors. For example, the connectors may be configured to aggregate data from the channels at predefined intervals. Such intervals may be specific for the company (in which case each company may have its own set schedule) or may be general for a set of companies (e.g., system-wide, domain-specific, etc.).

In an operation 320, process 300 may include initiating connector connections to their respective channels.

In an operation 322, process 300 may include formatting incoming data from the connectors to internalize the data.

In an operation 324, process 300 may include determining optimal metric values based on analysis of the data.

In an operation 326, process 300 may include applying model curves. For example, domain-specific weights may be applied to the data.

In an operation 328, process 300 may include comparing the company scores to the optimal metric values.

In an operation 330, process 300 may include calculating an overall score for the company based on the internalized data.

In an operation 332, process 300 may include generating interface elements to load the data for visualization and reporting based on the overall score and other findings.

In an operation 334, process 300 may include performing automated trend detection.

In an operation 340, process 300 may include performing automated algorithm refinement based on the internalized data.

In an operation 336, process 300 may include determining one or more strategies.

In an operation 338, process 300 may include generating a dashboard interface, including the interface elements generated at operation 332 and the strategies determined at operation 336.

In an operation 342, process 300 may include identifying strategy suggestions to implement. Such identification may be based on input received from the company via the dashboard interface and/or automated selection without such input.

In operations 344 and 346, process 300 may include implementing and monitoring the strategy implementation. The monitored strategy implementation may be used to feedback into the model so that the model may learn from this data.

FIGS. 4-6 depict various user interfaces, including a dashboard interface for configuring channels for data connectors, displaying and receiving acceptances of suggested actions, and displaying customer-specific information of a company, according to various implementations of the invention.

Figure 7:
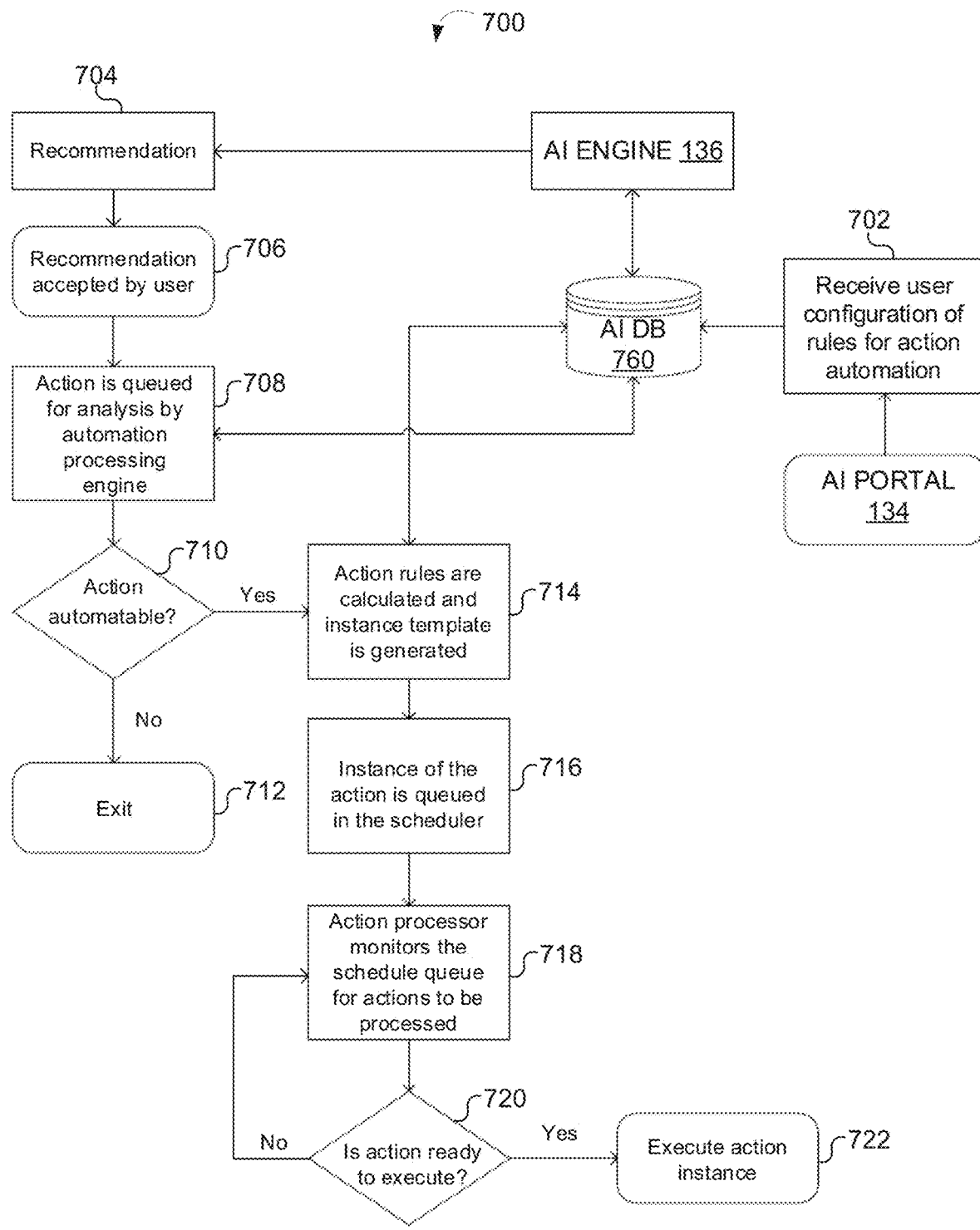
FIG. 7 illustrates an example of a process for automated action recommendation, execution, and monitoring, according to an implementation of the invention.

FIG. 7 illustrates an example of a process 700 for automated action recommendation, execution, and monitoring, according to an implementation of the invention.

In an operation 702, process 700 may include receiving a user configuration of rules for action automation. For example, an automation configuration may be received from the user via the AI portal 134, which may include one or more interfaces such as a web interface. The automation configuration may include rules for automating actions. The automation configuration may include an action type, an action target, an action template, an action rule, and/or other configuration settings.

An action type may specify a type of action to take. Different platforms may apply the same action type differently. For example, Facebook and Twitter may both support actions of type "Social Media Post" but the individual definition of those actions may be platform-specific. The action target may include a target at which the action is directed. For example, the action target may include a platform upon which the action is to be executed.

An action template may include a definition for how to perform the action. Action types applied to a certain target (platform) will have unique content templates, different parameters for API calls, etc. The action template may define a baseline for how a particular actions should be performed. The runtime engine will use these template definition to execute the action.

An action rule may include rules for automated execution of an action. For example, action rules may include a schedule, duration, thresholds, parameters, and sequence. In some instances, the user (e.g., the company) may be able to configure these rules visually through the AI portal 134.

The automation configuration may be stored in an AI database (illustrated as AI DB 760). The AI engine 136 may consult the AI database 760 and generate one or more recommendations in an operation 704, as described above with respect to FIG. 1. The system recommends actions for users to take in their connected marketing tools (e.g. create a Facebook post), and the automation rules process controls the automated execution of those actions. The recommendation may be provided to the user via the AI portal 134.

In an operation 706, a recommendation may be accepted by the user. For example, an acceptance of the recommendation may received from the user via the AI portal 134. When a recommended action is accepted by a user, it will queue that action for review by an automation processing engine, which may be employed by the AI engine 136. The automation processing engine may be a process that monitors a queue of actions to perform in an operation 708. The process may be process may continuously execute to monitor the queue of actions to perform. When the engine encounters an action in the queue, it will evaluate it as follows:

In an operation 710, the automation processing engine may determine whether the action is automatable. Not all actions are able to be performed automatically by the automation processing engine, possibly due to a lack of an API interface on which to perform the action or some other reason. If the action is not automatable, then processing may exit with respect to that action in an operation 712. It should be noted that processing may return to analyzing a next action in the queue. All possible actions in the system will be flagged as to whether or not they are able to be processed via automation.

If an action is determined to be automatable, the automation processing engine may determine whether there are rules that dictate its execution. Users may configure the rules that control the following aspects of action automation:

Scheduling—actions may be scheduled to be processed by the automation engine at a certain time of day, recur on a defined schedule, or restrict the action from running within a certain window.

Duration—actions may be performed one-time (such as social media posts) or may be performed for a certain duration (such as boosts or ad campaigns). The durations of an action may be calculated by the configuration rules.

Thresholds—actions may be constrained by certain thresholds and limits. A common application would be a budget threshold. Users may configure a maximum budget for an action or globally for a certain platform that will not allow the cost of an action to exceed a set limit.

Individual Parameters—certain actions have specific parameters related to their execution. For example, many actions will be performed via API calls. These API functions may have dynamic parameters whose values may be controlled at runtime and substituted by calculations from the automation engine.

Sequence—actions may be performed as a set of other actions, and the order of those operations may be calculated at runtime.

Once the rules for performing the action have been calculated in an operation 714, the action will be marked for processing based on its schedule and duration rules in an operation 716. Action parameters calculated at runtime will be saved into the instance of the scheduled action.

In an operation 718, the automation processing engine monitors scheduled actions to see if there are any action to perform in an operation 720, and if it finds any, it will execute them according to the parameters of the queued action in an operation 722.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of implementing computer intelligence for measuring the effectiveness of content transmitted by an entity through a set of predetermined networked electronic channels, the system comprising:

a computer system comprising one or more physical processors programmed with computer program instructions to implement at least a plurality of networked data connectors to connect to and obtain data from the predetermined channels, the computer system programmed to:

present a computer-generated user interface with display elements enabling the receipt of user-defined goals and user-defined rules specifying the manner in which the user-defined goals are to be achieved through the computerized intelligence;

store the user-defined rules;

send first content from the entity to one or more target entities via a first predetermined networked electronic channel comprising a first type of electronic communication platform;

connect a first networked data connector to the first predetermined networked electronic channel;

collect first data via the first networked data connector from the first predetermined networked electronic channel, the first data comprising information regarding the first content; the data collected from the first predetermined networked electronic channel comprises first collected data in a first format;

aggregate, in a channel information database, the first data obtained by the first networked data connector, associate the first data with the entity, and store the aggregated and associated first data in a channel information database;

interpret and normalize the first data obtained by the first networked data connector such that the first data is converted into an internalized format;

store the first data in the internalized format;

obtain the interpreted and normalized first data and generate a first channel score for the first predetermined networked electronic channel using the interpreted and normalized first data, the first channel score comprising a system-calculated effectiveness rating for the first channel for the entity and being calculated in a first manner based on the first type of electronic communication platform;

send second content from the entity to the one or more target entities via a second predetermined networked electronic channel comprising a second platform different from the first platform;

connect a second networked data connector to the second predetermined networked electronic channel;

collect second data via the second networked data connector from the second predetermined networked electronic channel, the second data comprising information regarding the second content; the data collected from the second predetermined networked electronic channel comprises second collected data in a second format different from the first;

aggregate, in the channel information database, the second data obtained by the second networked data connector;

interpret and normalize the second data obtained by the second networked data connector such that the second data is converted into the internalized format; and store the second data in the internalized format;

obtain the interpreted and normalized second data and generate a second channel score for the second predetermined networked electronic channel using the interpreted and normalized second data, the second channel scores comprising a system-calculated effectiveness rating for the second channel for the entity and being calculated in a second manner based on the second type of electronic communication platform, the second manner being different from the first manner;

generate an overall score based on the first and second channel scores;

store the first and second channel scores and the overall score;

use at least the stored first channel score to determine an action to be taken by the entity with respect to the first channel and the second channel score to determine an action to be taken by the entity with respect to the second channel;

update a stored machine learned computerized intelligence model for the entity based on the aggregated first data and second data, the model comprising input metrics, including specific actions that have been taken with respect to one or more channels of the set of predetermined networked electronic channels and/or a specific state regarding the channel, correlated with one or more result metrics to automatically learn from the aggregated first and second data, wherein a first input metric is correlated to result in a first result metric;

retrieve, from the data storage device, one or more of the user-defined rules, wherein the user-defined rules specify how to achieve the user-defined goals by defining preferences for selecting one or more actions to be taken with respect to one or more of the set of predetermined networked electronic channels;

identify, for the entity, at least a first channel result to be achieved by the one or more channel actions via at least the first networked electronic channel based on the one or more user-defined rules;

correlate, via the stored machine learned computerized intelligence model, the first channel result to be achieved with the first result metric and the first input metric with a first channel action to be taken;

generate a suggestion for the entity to take the first channel action;

provide the suggestion via the computer-generated user interface;

provide one or more display options on the computer-generated user interface to accept the suggestion;

receive an indication that the suggestion has been accepted;

collect further data via the first networked data connector from the first predetermined networked electronic channel;

collect further data via the second networked data connector from the second predetermined networked electronic channel;

re-aggregate, in the channel information database, the further data obtained by the networked data connectors, the further data comprising information regarding content that has been sent by an entity and delivered via at least the first predetermined networked electronic channel and the second predetermined networked electronic channel; and update the stored machine learned computerized intelligence model based on the re-aggregated information, wherein the updated machine learned computerized intelligence model includes a correlation between the first action and results of the first action.

2. The system of claim 1, wherein the computer system is further programmed to:

provide the first channel score, the second channel score, and the overall score via the computer-generated user interface.

3. The system of claim 2, wherein the first channel score, the second channel scores, and the overall score are domain-specific such that the first channel score, the second channel scores, and the overall score are relative to other scores of other entities in the industry to which the entity belongs.

4. The system of claim 2, wherein the computer system is further programmed to:

compare the first channel score to a predefined threshold channel score;

determine that the first channel score deviates from the predefined threshold channel score by a predetermined amount based on the comparison; and utilize the determination of the first channel score deviation to determine an action to be taken by the entity with respect to the first channel.

5. The system of claim 1, wherein the computer system is further programmed to:

compare the overall score to a predefined threshold entity score;

determine that the overall score deviates from the predefined threshold entity score by a second predetermined amount based on the comparison of the overall score to the predefined threshold entity score; and utilize the determination of the overall score deviation to determine an action to be taken by the entity with respect to the first or second channels.

6. The system of claim 1, wherein the computer system is further programmed to:

obtain external data that indicates a state of an environment or location of the entity;

update the machine learned computerized intelligence mod& based on the external data, wherein the machine learned computerized intelligence model correlates the external data with one or more result metrics to automatically learn from the external data.

7. The system of claim 6, wherein the external data specifies weather conditions for a period of time, and wherein the suggestion for the entity to take the first action includes a recommendation to refrain from marketing activities on the first networked electronic channel for the period of time.

8. The system of claim 7, wherein the external data specifies weather conditions for a period of time, and wherein the suggestion for the entity to take the first action further includes a second recommendation to perform a particular marketing activity on the first networked electronic channel after the period of time.

9. The system of claim 1, wherein the suggestion for the entity to take the first action comprises a suggestion to deliver second content via the first networked electronic channel.

10. The system of claim 1, wherein the user-defined rules comprise one or more of a specification to use a particular sales strategy, action, market platform, discount, monetary instrument, location, customer loyalty program, demand or sensitivity quotient, customer traceability and behavior recognition, market platforms and effectiveness indices, and correlation tracking.

11. The system of claim 1, wherein the first channel score, second channel score, and overall score are on a numerical or letter scale defined by the system.

12. The system of claim 1, wherein generating a suggestion for the entity to take the first channel action comprises generating and ordering a plurality of suggestions for the entity to take.

13. The system of claim 1, wherein the user-defined rules comprise rules ranking the priority of individual goals.

14. The system of claim 1, wherein the first type of electronic communication platform is a social media communication platform and the second electronic communication platform is a non-social media communication platform.

15. The system of claim 1, wherein the first type of electronic communication platform is a first social media communication platform and the second electronic communication platform is a second social media communication platform different from the first.

16. A computer-implemented method of computer intelligence for measuring the effectiveness of content transmitted by an entity through a set of predetermined networked electronic channels, the method being implemented by a computer system comprising one or more physical processors programmed with computer program instructions to implement at least a plurality of networked data connectors to connect to and obtain data from the predetermined channels, the method comprising:

presenting a computer-generated user interface with display elements for enabling the receipt of user-defined goals and user-defined rules specifying the manner in which the user-defined goals are to be achieved through the computerize intelligence;

storing the user-defined rules;

sending first content from the entity to one or more target entities via a first predetermined networked electronic channel comprising a first type of electronic communication platform;

connecting a first networked data connector to the first predetermined networked electronic channel;

collecting first data via the first networked data connector from the first predetermined networked electronic channel, the first data comprising information regarding the first content; the data collected from the first predetermined networked electronic channel comprises first collected data in a first format;

aggregating, in a channel information database, the first data obtained by the first networked data connector, associating the first data with the entity, and storing the aggregated and associated first data in a channel information database;

interpreting and normalizing the first data obtained by the first networked data connector;

converting, by the computer system, the first collected data in a first format into an internalized format;

storing, by the computer system, the first collected data in the internalized format;

obtaining the interpreted and normalized first data and generating a first channel score for the first predetermined networked electronic channel using the interpreted and normalized first data, the first channel score comprising a system-calculated effectiveness rating for the first channel for the entity and being calculated in a first manner based on the first type of electronic communication platform;

sending second content from the entity to the one or more target entities via a second predetermined networked electronic channel comprising a second platform different from the first platform;

connecting a second networked data connector to the second predetermined networked electronic channel;

collecting second data via the second networked data connector from the second predetermined networked electronic channel, the second data comprising information regarding the second content; the data collected from the second predetermined networked electronic channel comprises second collected data in a second format different from the first; and aggregating, in the channel information database, the second data obtained by the second networked data connector;

interpreting and normalizing, by the computer system, the second data obtained by the second networked data connector;

converting, by the computer system, the second collected data in a second format into the internalized format; and storing, by the computer system, the second collected data in the internalized format;

obtaining the interpreted and normalized second data and generating, by the computer system a second channel score for the second predetermined networked electronic channel using the interpreted and normalized second data, the second channel scores comprising a system-calculated effectiveness rating for the second channel for the entity; and being calculated in a second manner based on the second type of electronic communication platform, the second manner being different from the first manner;

generating an overall score based on the first and second channel scores;

storing the first and second channel scores and the overall score;

using, by the computer system, at least the stored first channel score to determine an action to be taken by the entity with respect to the first channel and the second channel score to determine an action to be taken by the entity with respect to the second channel;

updating, by the computer system, a stored machine learned computerized intelligence model for the entity based on the aggregated first data and second data, the model comprising input metrics, including specific actions that have been taken with respect to one or more channels of the set of predetermined networked electronic channels and/or a specific state regarding the channel, correlated with one or more result metrics to automatically learn from the aggregated first and second data, wherein a first input metric is correlated to result in a first result metric;

retrieving, by the computer system, from the data storage device, one or more of the user-defined rules, wherein the user-defined rules specify how to achieve the user-defined goals by defining preferences for selecting one or more actions to be taken with respect to one or more of the set of predetermined networked electronic channels;

identifying, by the computer system, for the entity, at least a first channel result to be achieved by the one or more channel actions via at least the first networked electronic channel based on the one or more user-defined rules;

correlating, by the computer system, via the stored machine learned computerized intelligence model, the first channel result to be achieved with the first result metric and the first input metric with a first channel action to be taken;

generating, by the computer system, a suggestion for the entity to take the first channel action;

providing, by the computer system, the suggestion via the computer-generated user interfaces;

providing, by the computer system, one or more display options on the computer-generated user interface to accept the suggestion;

receiving, by the computer system, an indication that the suggestion has been accepted;

collecting further data via the first networked data connector from the first predetermined networked electronic channel;

collecting further data via the second networked data connector from the second predetermined networked electronic channel;

re-aggregating, by the computer system, in the channel information database, the further data obtained by the networked data connectors, the further data comprising information regarding content that has been sent by an entity and delivered via at least the first predetermined networked electronic channel and the second predetermined networked electronic channel; and updating, by the computer system, the stored machine learned computerized intelligence model based on the re-aggregated information, wherein the updated machine learned computerized intelligence model includes a correlation between the first action and results of the first action.

17. The method of claim 16, further comprising:
providing, by the computer system, the first channel score, the second channel score, and the overall score via the computer-generated user interface.

18. The method of claim 17, wherein the first channel score, the second channel score, and the overall score are domain-specific such that the first channel score, the second channel scores, and the overall score are relative to other scores of other entities in the industry to which the entity belongs.

19. The method of claim 17, further comprising:
comparing, by the computer system, the first channel scores to a predefined threshold channel score;
determining, by the computer system, that the first channel score deviates from the predefined threshold channel score by a predetermined amount based on the comparison; and
utilize the determination of the first channel score deviation to determine an action to be taken by the entity with respect to the first channel.

20. The method of claim 16, further comprising:
comparing, by the computer system, the overall score to a predefined threshold entity score;
determining, by the computer system, that the overall score deviates from the predefined threshold entity score by a second predetermined amount based on the comparison of the overall score to the predefined threshold entity score; and
utilize the determination of the overall score deviation to determine an action to be taken by the entity with respect to the first channel.

21. The method of claim 16, further comprising:
obtaining, by the computer system, external data that indicates a state of an environment or location of the entity;
updating, by the computer system, the machine learned computerized intelligence model based on the external data, wherein the machine learned computerized intelligence model correlates the external data with one or more result metrics to automatically learn from the external data.

22. The method of claim 21, wherein the external data specifies weather conditions for a period of time, and wherein the suggestion for the entity to take the first action includes a recommendation to refrain from marketing activities on the first networked electronic channel for the period of time.

23. The method of claim 22, wherein the external data specifies weather conditions for a period of time, and wherein the suggestion for the entity to take the first action further includes a second recommendation to perform a particular marketing activity on the first networked electronic channel after the period of time.

24. The method of claim 16, wherein the suggestion for the entity to take the first action comprises a suggestion to deliver second content via the first networked electronic channel.

25. The method of claim 16, wherein the user-defined rules comprise one or more of a specification to use a particular sales strategy, action, market platform, discount, monetary instrument, location, customer loyalty program, demand or sensitivity quotient, customer traceability and behavior recognition, market platforms and effectiveness indices, and correlation tracking.

26. The method of claim 16, wherein the first channel score, second channel score, and overall score are on a numerical or letter scale defined by the system.

27. The method of claim 16, wherein generating a suggestion for the entity to take the first channel action comprises generating and ordering a plurality of suggestions for the entity to take.

28. The method of claim 16, wherein the user-defined rules comprise rules ranking the priority of individual goals.

29. The method of claim 16, wherein the first type of electronic communication platform is a social media communication platform and the second electronic communication platform is a non-social media communication platform.

30. The method of claim 16, wherein the first type of electronic communication platform is a first social media communication platform and the second electronic communication platform is a second social media communication platform different from the first.

* * * * *

UNITED STATES PATENT AND TRADEMARK OFFICE
CERTIFICATE OF CORRECTION

| | |
|---|---|
| PATENT NO. | : 11,494,721 B1 |
| APPLICATION NO. | : 16/059379 |
| DATED | : November 8, 2022 |
| INVENTOR(S) | : Thomas Lah |

It is certified that error appears in the above-identified patent and that said Letters Patent is hereby corrected as shown below:

In the Claims

Column 31, Line 28, (Claim 1, Line 68), change "generate-a" to --generate a--;

Column 32, Line 67, (Claim 6, Line 6), change "mod&" to --model--;

Column 35, Line 34, (Claim 16, Line 121), change "interfaces;" to --interface;--.

Signed and Sealed this
Seventh Day of March, 2023

Katherine Kelly Vidal
*Director of the United States Patent and Trademark Office*